United States Patent
Geaghan

(10) Patent No.: US 10,168,825 B2
(45) Date of Patent: Jan. 1, 2019

(54) CAPACITIVE TOUCH SYSTEMS AND METHODS USING DIFFERENTIAL SIGNAL TECHNIQUES

(71) Applicant: 3M INNOVATIVE PROPERTIES COMPANY, St. Paul, MN (US)

(72) Inventor: Bernard O. Geaghan, Salem, NH (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 15/107,113

(22) PCT Filed: Dec. 22, 2014

(86) PCT No.: PCT/US2014/071782
§ 371 (c)(1),
(2) Date: Jun. 22, 2016

(87) PCT Pub. No.: WO2015/102977
PCT Pub. Date: Jul. 9, 2015

(65) Prior Publication Data
US 2016/0342265 A1    Nov. 24, 2016

Related U.S. Application Data

(60) Provisional application No. 61/923,257, filed on Jan. 3, 2014.

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ..................................................... G06F 3/0416
See application file for complete search history.

(56) References Cited

U.S. PATENT DOCUMENTS

| 4,686,332 | A | 8/1987 | Greanias |
| 5,305,017 | A | 4/1994 | Gerpheide |

(Continued)

FOREIGN PATENT DOCUMENTS

| CN | 102004592 | 4/2011 |
| CN | 102023768 | 4/2011 |

(Continued)

OTHER PUBLICATIONS

PCT International Search Report from PCT/US2014/071782 dated Mar. 9, 2015, 4 pages.

*Primary Examiner* — Rodney Amadiz
(74) *Attorney, Agent, or Firm* — Jonathan L. Tolstedt

(57) ABSTRACT

An approach for determining touch location on a touch panel includes receiving information indicative of which of the electrodes in the first set of electrodes are not experiencing, or are unlikely to experience, a touch is received. Based on the received information, at least one electrode is selected from the first set of electrodes to function as a first reference electrode, remaining ones of the first set of electrodes referred to as first remaining electrode. Touch signals are measured for at least some of the touch panel nodes using a differential technique. The differential technique for each such node utilizes the first reference electrode in combination with at least one of the first remaining electrodes and with at least one of the electrodes from the second set of electrodes.

23 Claims, 12 Drawing Sheets

(56) References Cited

U.S. PATENT DOCUMENTS

| | | |
|---|---|---|
| 7,292,229 B2 | 11/2007 | Morag |
| 7,649,524 B2 | 1/2010 | Haim |
| 7,812,827 B2 | 10/2010 | Hotelling |
| 2008/0142281 A1 | 6/2008 | Geaghan |
| 2008/0309625 A1 | 12/2008 | Krah |
| 2009/0251434 A1* | 10/2009 | Rimon ............... G06F 1/30 345/173 |
| 2009/0273579 A1 | 11/2009 | Zachut |
| 2010/0073323 A1 | 3/2010 | Geaghan |
| 2010/0328262 A1 | 12/2010 | Huang |
| 2011/0025629 A1 | 2/2011 | Grivna |
| 2011/0157066 A1 | 6/2011 | Waterbury |
| 2011/0163766 A1 | 7/2011 | Geaghan |
| 2011/0216033 A1 | 9/2011 | Mamba et al. |
| 2011/0248932 A1 | 10/2011 | Wu |
| 2011/0261006 A1 | 10/2011 | Joharapurkar |
| 2012/0013565 A1 | 1/2012 | Westhues |
| 2012/0075220 A1* | 3/2012 | Matsui ............ G06F 3/0416 345/173 |
| 2012/0113047 A1 | 5/2012 | Hanauer |
| 2012/0249433 A1 | 10/2012 | Deng et al. |
| 2012/0319994 A1 | 12/2012 | Hatano |
| 2013/0257786 A1 | 10/2013 | Brown |
| 2016/0004357 A1 | 1/2016 | Westhues et al. |

FOREIGN PATENT DOCUMENTS

| | | |
|---|---|---|
| TW | 2011-26400 | 8/2011 |
| WO | WO 2010/111668 | 9/2010 |
| WO | WO 2012/006929 | 1/2012 |

* cited by examiner

CAPACITIVE TOUCH SYSTEMS AND METHODS USING DIFFERENTIAL SIGNAL TECHNIQUES

TECHNICAL FIELD

This disclosure relates generally to touch-sensitive devices, particularly those that rely on a capacitive coupling between a user's finger or other touch implement and the touch device.

BACKGROUND

Touch-sensitive devices allow a user to conveniently interface with electronic systems and displays by reducing or eliminating the need for mechanical buttons, keypads, keyboards, and pointing devices. For example, a user can carry out a complicated sequence of instructions by simply touching an on-display touch screen at a location identified by an icon.

There are several types of technologies for implementing a touch-sensitive device including, for example, resistive, infrared, capacitive, surface acoustic wave, electromagnetic, near field imaging, etc. Capacitive touch-sensing devices have been found to work well in a number of applications. In many touch-sensitive devices, the input is sensed when a conductive object in the sensor is capacitively coupled to a conductive touch implement such as a user's finger. Generally, whenever two electrically conductive members come into proximity with one another without actually touching, a capacitance is formed therebetween. In the case of a capacitive touch-sensitive device, as an object such as a finger approaches the touch sensing surface, a tiny capacitance forms between the object and the sensing points in close proximity to the object. By detecting changes in capacitance at each of the sensing points and noting the position of the sensing points, the sensing circuit can recognize multiple objects and determine the characteristics of the object as it moves across the touch surface.

There are two known techniques used to capacitively measure touch. The first is to measure capacitance-to-ground, whereby a signal is applied to an electrode. The first method is referred to as self-capacitance herein. A touch in proximity to the electrode causes signal current to flow from the electrode, through an object such as a finger, to electrical ground.

According to various embodiments, a technique is used to capacitively measure touch is through mutual capacitance. Mutual capacitance touch screens apply a signal to a driven electrode, which is capacitively coupled to a receiver electrode by an electric field. Signal coupling between the two electrodes is reduced by an object in proximity, which reduces the capacitive coupling.

BRIEF SUMMARY

Embodiments disclosed herein include a method for determining touches on a touch panel, the touch panel comprising a plurality of electrodes arranged in an electrode matrix. The electrode matrix includes a first set of electrodes capacitively coupled to a second set of electrodes at an array of nodes defining an active touch-sensitive area of the touch panel. Information indicative of which of the electrodes in the first set of electrodes are not experiencing, or are unlikely to experience, a touch is received. Based on the received information, at least one electrode is selected from the first set of electrodes to function as a first reference electrode, remaining ones of the first set of electrodes referred to as first remaining electrode. Touch signals are measured for at least some of the nodes using a differential technique. The differential technique for each such node utilizes the first reference electrode in combination with at least one of the first remaining electrodes and with at least one of the electrodes from the second set of electrodes.

Some embodiments disclosed herein involve a method of determining touches on a touch panel. The touch panel comprising a plurality of electrodes arranged in an electrode matrix comprising a first set of electrodes capacitively coupled to a second set of electrodes at an array of nodes defining an active touch-sensitive area of the touch panel. The method includes selecting at least one electrode from the first set of electrodes to function as a first reference electrode, remaining ones of the first set of electrodes referred to as first remaining electrodes. The touch signals for at least some of the nodes are measured using a differential technique, the differential technique for each such node utilizing the first reference electrode in combination with at least one of the first remaining electrodes and with at least one of the electrodes from the second set of electrodes. The measured touch signals are monitored for an indication that the first reference electrode is experiencing a touch. In response to the indication, at least one different electrode from the first set of electrodes is selected to function as the first reference electrode.

Some embodiments are directed to a device comprising a touch panel having a plurality of electrodes arranged in an electrode matrix comprising a first set of electrodes capacitively coupled to a second set of electrodes at an array of nodes defining an active touch-sensitive area of the touch panel. Controller electronics is coupled to the touch panel, the controller electronics is configured to:

- receive information indicative of which of the electrodes in the first set of electrodes are not experiencing, or are unlikely to experience, a touch;
- select, based on the received information, at least one electrode from the first set of electrodes to function as a first reference electrode, remaining ones of the first set of electrodes referred to as first remaining electrodes; and
- measure touch signals for at least some of the nodes using a differential technique, the differential technique for each such node utilizing the first reference electrode in combination with at least one of the first remaining electrodes and with at least one of the electrodes from the second set of electrodes.

Some embodiments are directed to a device comprising a touch panel having a plurality of electrodes arranged in an electrode matrix comprising a first set of electrodes capacitively coupled to a second set of electrodes at an array of nodes defining an active touch-sensitive area of the touch panel. Controller electronics is coupled to the touch panel, the controller electronics is configured to:

- select at least one electrode from the first set of electrodes to function as a first reference electrode, remaining ones of the first set of electrodes referred to as first remaining electrodes;
- measure touch signals for at least some of the nodes using a differential technique, the differential technique for each such node utilizing the first reference electrode in combination with at least one of the first remaining electrodes and with at least one of the electrodes from the second set of electrodes;
- monitor the measured touch signals for an indication that the first reference electrode is experiencing a touch; and in response to the indication, select at least one different electrode from the first set of electrodes to function as the first reference electrode.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

In the figures, like reference numerals designate like elements.

DETAILED DESCRIPTION OF ILLUSTRATIVE EMBODIMENTS

Capacitive touch screens technologies may be vulnerable to various types of error sources including stray capacitance and common mode noise. Stray capacitance can be a concern in both mutual and self-capacitive touch screens. The system may expend resources detecting and/or compensating for the stray capacitance present in the system. As described herein, differential (opposite-phase) drive signals and/or differential receive signals may be used to reduce stray capacitance and common mode noise leading to reduced sensor scan time.

Figure 1:
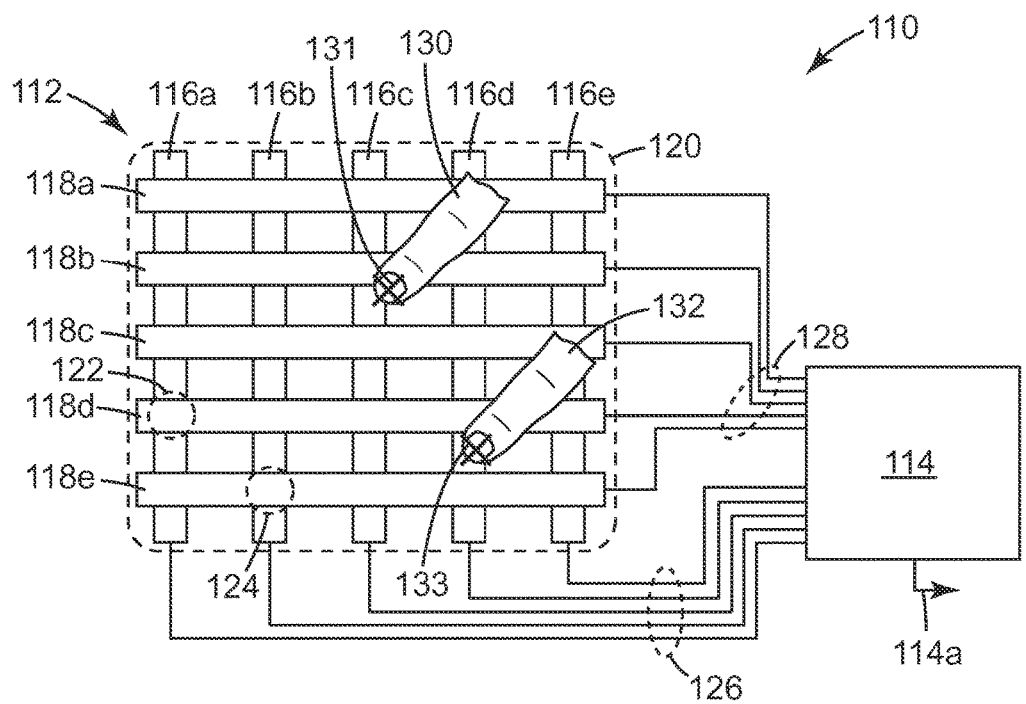
FIG. 1 is a diagram of an exemplary touch sensitive device.

Turning now to FIG. 1, an exemplary touch device 110 is shown. The device 110 includes a touch panel 112 connected to electronic circuitry, which for simplicity is grouped together into a single schematic box labeled 114 and referred to collectively as a controller. The controller 114 comprises a processor or other circuitry configured to perform various processes described herein, such as processes illustrated the flow diagram of FIG. 9 and/or the flow diagram of FIG. 10, for example.

The touch panel 112 is shown as having a 5×5 matrix of column electrodes 116a-e and row electrodes 118a-e, but other numbers of electrodes and other matrix sizes can also be used. The panel 112 is typically substantially transparent so that the user is able to view an object, such as the pixilated display of a computer, hand-held device, mobile phone, or other peripheral device, through the panel 112. The boundary 120 represents the viewing area of the panel 112 and also the viewing area of such a display, if used. The electrodes 116a-e, 118a-e are spatially distributed, from a plan view perspective, over the viewing area 120. For ease of illustration the electrodes are shown to be wide and obtrusive, but in practice they may be relatively narrow and inconspicuous to the user. Further, they may be designed to have variable widths, e.g., an increased width in the form of a diamond- or other-shaped pad in the vicinity of the nodes of the matrix in order to increase the inter-electrode fringe field and thereby increase the effect of a touch on the electrode-to-electrode capacitive coupling. In exemplary embodiments the electrodes may be composed of indium tin oxide (ITO) or other suitable electrically conductive materials. From a depth perspective, the column electrodes may lie in a different plane than the row electrodes such that no significant ohmic contact is made between column and row electrodes, and so that the only significant electrical coupling between a given column electrode and a given row electrode is capacitive coupling. From the perspective of FIG. 1, the column electrodes 116a-e lie underneath the row electrodes 118a-e. The matrix of electrodes typically lies beneath a cover glass, plastic film, or the like, so that the electrodes are protected from direct physical contact with a user's finger or other touch-related implement. An exposed surface of such a cover glass, film, or the like may be referred to as a touch surface.

The capacitive coupling between a given row and column electrode is primarily a function of the geometry of the electrodes in the region where the electrodes are closest together. Such regions correspond to the "nodes" of the electrode matrix, some of which are labeled in FIG. 1. For example, capacitive coupling between column electrode 116a and row electrode 118d occurs primarily at node 122, and capacitive coupling between column electrode 116b and row electrode 118e occurs primarily at node 124. The 5×5 matrix of FIG. 1 has 25 such nodes, anyone of which can be addressed by controller 114 via appropriate selection of one of the control lines 126, which individually couple the respective column electrodes 116a-e to the controller 114, and appropriate selection of one of the control lines 128, which individually couple the respective row electrodes 118a-e to the controller 114.

When a finger 130 of a user or other touch implement comes into contact or near-contact with the touch surface of the device 110, as shown at touch location 131, the finger capacitively couples to the electrode matrix. The finger draws charge from the matrix, especially from those electrodes lying closest to the touch location, and in doing so it changes the coupling capacitance between the electrodes corresponding to the nearest node(s). For example, the touch at touch location 131 lies nearest the node corresponding to electrodes 116c/118b. As described further below, this change in coupling capacitance can be detected by controller 114 and interpreted as a touch, or partial touch, at or near the 116c/118b node. The controller 4 can be configured to rapidly detect the changes in capacitance, if any, of all of the nodes of the matrix, and is capable of analyzing the magnitudes of capacitance changes for neighboring nodes so as to accurately determine a touch location lying between nodes by interpolation.

Furthermore, the controller 114 may be designed to detect multiple distinct touches applied to different portions of the touch device at the same time, or at overlapping times. Thus, for example, if another finger 132 touches the touch surface of the device 110 at touch location 133 simultaneously with the touch of finger 130, or if the respective touches at least temporally overlap, the controller 114 may be capable of detecting the positions 131, 133 of both such touches and providing such locations on a touch output 114a. The number of distinct simultaneous or temporally overlapping touches capable of being detected by controller 114 is not limited to 2, e.g., it may be 3, 4, or more, depending on the size of the electrode matrix. In at least some of the disclosed embodiments the number of temporally overlapping touches capable of being detected equals the number of nodes in the electrode matrix.

As discussed further below, the controller 114 may employ a variety of circuit modules and components that enable it to rapidly determine the coupling capacitance at some or all of the nodes of the electrode matrix. Note that the coupling capacitance can be determined by measuring any suitable parameter or quantity whose value depends on the coupling capacitance. For example, the controller may include a plurality of signal generators that form part of a drive unit. The drive unit delivers drive signals from the signal generators to one set of electrodes, referred to as drive electrodes. In the embodiment of FIG. 1, the column electrodes 116a-e may be used as drive electrodes, or the row electrodes 118a-e may be so used. In some embodiments, the drive unit delivers multiple drive signals to various ones of the drive electrodes at the same time. For example, the drive unit may deliver a first drive signal to a first drive electrode, while also delivering a second drive signal to a second drive electrode, while also delivering a third drive signal to a third drive electrode, and so forth. According to various embodiments, the different drive signals oscillate at different drive frequencies. While the drive signals are applied, the controller may monitor one, some, or all of the other set of electrodes, referred to as receive electrodes.

The controller 114 may, for example, include one or more sense units coupled to the receive electrodes. A given sense unit receives a response signal from a given receive electrode, the response signal containing signal components at the different drive frequencies. The sense unit may amplify, filter, or otherwise condition the response signal so that the amplitudes of the signal components, which are responsive respectively to the coupling capacitances between the receive electrode and the various drive electrodes that are being driven, can be readily measured by a measurement unit. The measurement unit may utilize a maximum likelihood estimation (MLE) technique to measure the respective amplitudes of the various signal components, which amplitudes are responsive to the coupling capacitance at the nodes defined by the receive electrode and the various drive electrodes that are being driven, and thus also responsive to the touch status of such nodes. The sense unit may sense the response signals from all of the sense electrodes in this manner and measures their respective signal components in the same way. After all such measurements have been made, the controller 114 can compare the signal component amplitude measurements to stored reference values for each of the nodes in order to generate a map of which nodes, if any, have experienced a change in coupling capacitance due to the presence of a touch. The stored reference values may be measurements of the coupling capacitances made previously for each of the nodes in the absence of any touches.

As described further below, the controller may also include one or more analog-to digital converters (ADCs) to convert signals from an analog format to a digital format. Digital-to-analog converters (DACs) may also be used, for example in one or more drive units to convert digital values to an analog drive signal. One or more multiplexers and switches may also be used to avoid unnecessary duplication of circuit elements. In some cases, the controller includes one or more memory devices in which to store the measured amplitudes and associated parameters, and a microprocessor to perform the necessary calculations and control functions. In some cases the controller, and/or other portions of the touch device, can also embody one or more application-specific integrated circuits (ASICs), application specific standard products (ASSPs), or the like, to carry out one or more of the functions described herein.

By measuring an amplitude of the signal component associated with each of the nodes in the electrode matrix, the controller can generate a matrix of measured values related to the coupling capacitances for each of the nodes of the electrode matrix. The controller can then compare these measured values to a similar matrix of previously obtained reference values in order to determine which nodes, if any, have experienced a change in coupling capacitance due to the presence of a touch.

Figure 2:
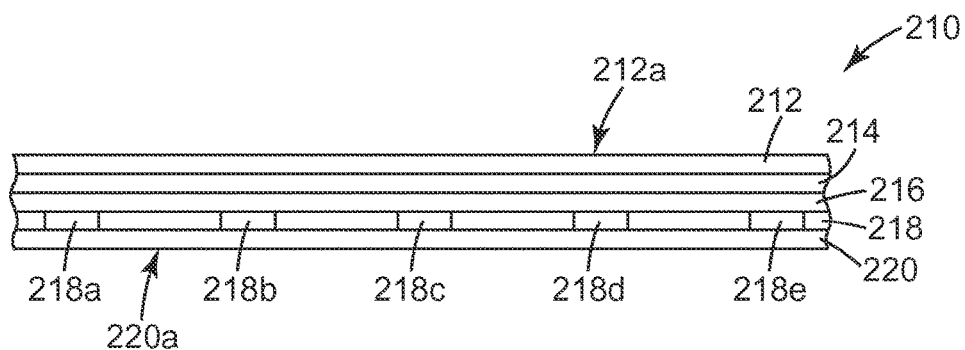
FIG. 2 shows a side cross section of an exemplary touch sensitive device.

Turning now to FIG. 2, we see there a schematic side view of a portion of a touch panel 210 for use in a touch device. The panel 210 includes a front layer 212, first electrode layer 214 comprising a first set of electrodes, insulating layer 216, second electrode layer 218 comprising a second set of electrodes 218a-e orthogonal to the first set of electrodes, and a rear layer 220. The exposed surface 212a of layer 212, or the exposed surface 220a of layer 220, may be or comprise the touch surface of the touch panel 210. The reader will understand that other touch panel designs can be used without limitation.

Figure 3:
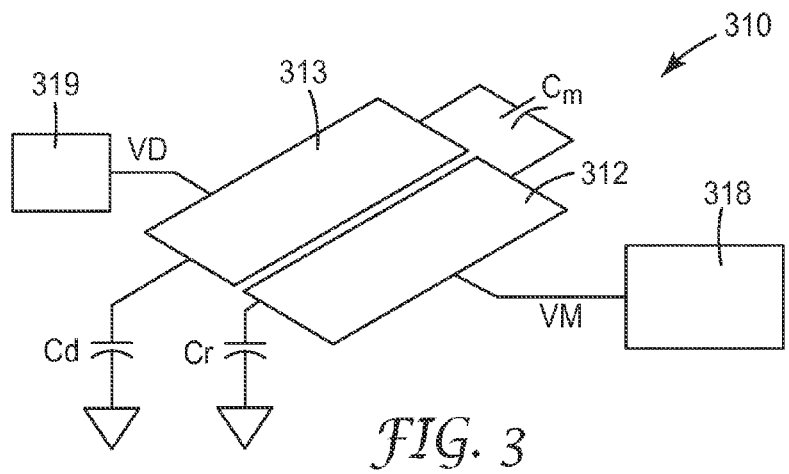
FIG. 3 provides a simplified schematic of a device for measuring mutual capacitance between two electrodes.

FIG. 3 shows a simplified schematic of a device 310 for measuring mutual capacitance Cm between two electrodes 312 and 313. Measurement circuitry 318 and drive circuitry 319 are connected to receiver electrode 312 and driven electrode 313, respectively, and are used to measure Cm. In the device 310 shown in FIG. 3, at least one unknown mutual capacitance (denoted Cm herein) results from coupling between electrodes, and second and third unknown capacitances (denoted Cd and Cr herein) result from coupling between driven electrode Cr and ground, and receive electrode Cr and ground. Cm, Cd and Cr change when an object or substance comes into proximity with the electric field generated when a drive signal, e.g., an AC voltage, is applied to at least one of the electrodes. This change in Cm, Cd, and/or Cr may be used as a basis for identifying a touch or the presence of an object.

Figure 4:
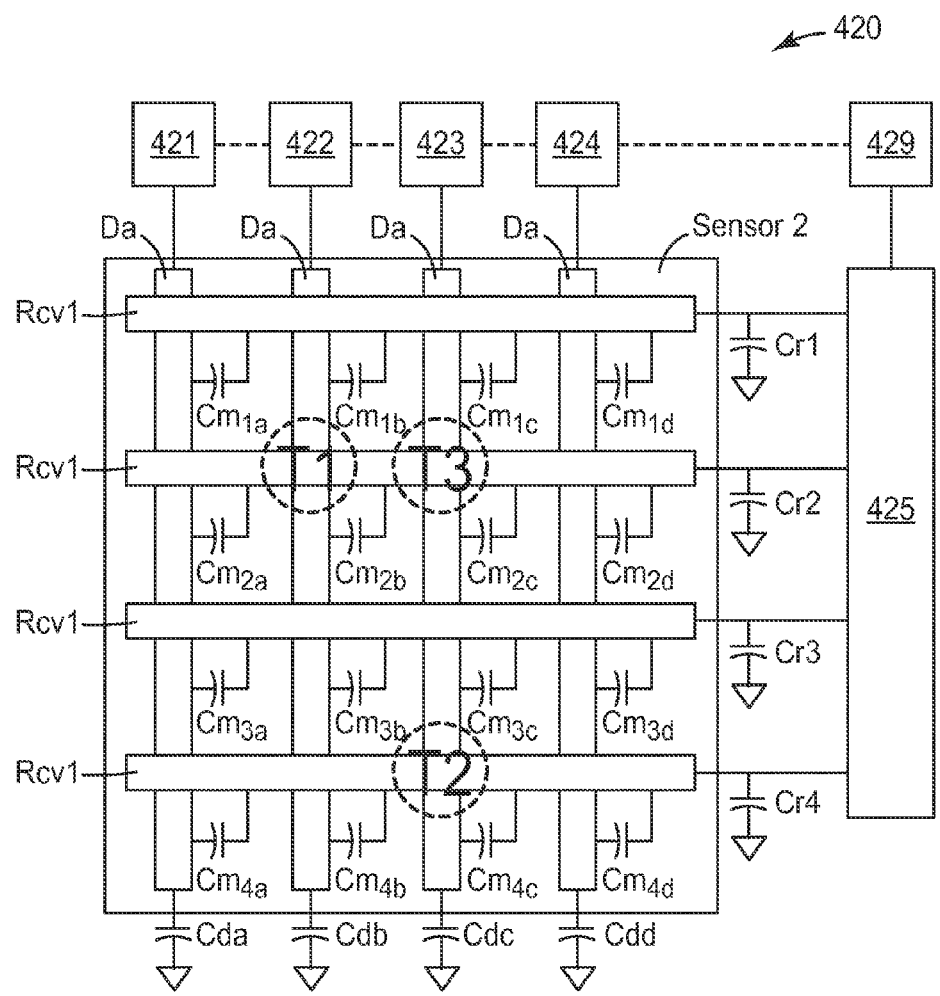
FIG. 4 shows a simplified schematic of a device that includes drive electrodes and receive electrodes arranged in a matrix.

FIG. 4 shows a simplified schematic of a device 420 that includes electrodes Da-Dd and Rcv1-Rcv 4 arranged in a matrix. The device 420 is configured for measuring locations of one or more touching objects (e.g., finger or stylus), such as the location of touches to points T1, T2, and T3. Driven electrodes Da-Dd have capacitances to ground Cda-Cdd, respectively, and receive electrodes Rcv1-Rcv4 have capacitances to ground Cr1-Cr4, respectively. Capacitances Cda-Cdd and Cr1-Cr4 change when a touching object is in proximity. Capacitances to ground Cr1-Cr4 of the receive electrodes Rcv1-Rcv4 electrodes and/or inter-electrode (mutual) capacitances Cm1a-Cm4d can be measured by the methods disclosed herein. Touch locations are resolved (located) by measuring changes in capacitances Cm and/or Cr. In an exemplary matrix mutual capacitance sensor as shown in FIG. 4, mutual capacitances Cm are approximately equal, and equal Cm's are assumed unless otherwise stated. According to various implementations, capacitances to ground Cr and Cd may be larger in magnitude than Cm.

Drive circuits 421, 422, 423, and 424 apply signals to electrodes Da, Db, De, and Dd respectively under the control of controller 429. Receive circuits 425, 426, 427, and 428 accumulate and measure signals on receiver electrodes Rcv1-Rcv4 respectively, under the control of controller 429. In some embodiments, circuits 421-428 may be switched between drive and receive functions, so in one mode Da-Dd are driven electrodes while Rcv1-Rcv4 are receive electrodes, and in another mode Rcv1-Rcv4 are driven electrodes while Da-Dd receive signals.

Example touches T1, T2, and T3 are shown as directly on electrode intersections, affecting primarily a nearest receive electrode. This is for illustration purposes only; with typical matrix touch screens, a single touch will affect capacitance and signals on two or more adjacent receive electrodes, and interpolation methods are used to resolve touch locations with finer resolution than the spacing of electrodes. Where interpolation is used, additional measurements of Cm may be performed on electrodes adjacent to touched electrodes.

Figure 5:
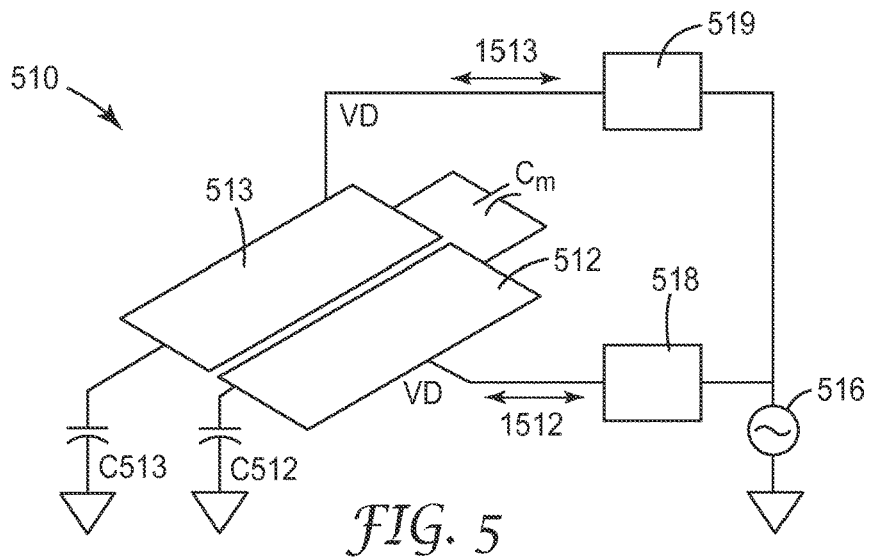
FIG. 5 provides a simplified schematic of a device for measuring self-capacitances of two electrodes.

FIG. 5 shows a simplified schematic of a device 510 for measuring self-capacitances C512 and C513 of two electrodes 512 and 513. AC voltage source 516 applies equal voltage VD to both electrodes 512 and 513 and current measurement circuits 518 and 519 measure currents I512 and I513 flowing to electrodes 512 and 513, respectively. Given the known AC voltage VD and measured currents I512 and I513, capacitances C512 and C513 may be calculated. No net current flows through mutual capacitance Cm, so Cm is not measured. C512 and C513 change when an object or substance comes into proximity with the electric field generated when drive signal VD is applied to the electrodes. This change in C512 and/or C513 may be used as a basis for identifying a touch or the presence of an object. According to embodiments described herein, a differential technique may be employed in determining a touch location on a touch screen. For example, in some embodiments, the differential technique involves first and second drive electrodes that are respectively driven using first and second AC signals having opposite phases. In some embodiments, first and second receive electrodes may be measured using a differential technique.

Figure 6:
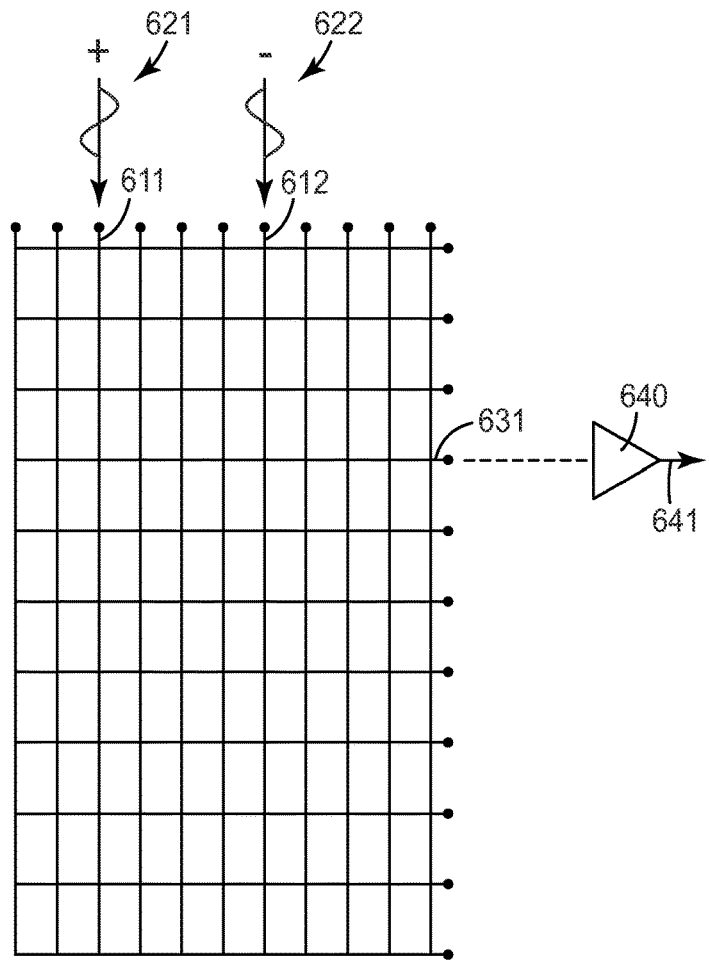
FIG. 6 shows an example of a touch sensitive electrode matrix in which first and second drive electrodes are respectively driven with two signals of opposite phase.

FIG. 6 shows an example of a touch sensitive electrode matrix in which first and second drive electrodes 611, 612 are respectively driven with two signals 621, 622 of opposite phase. This example shows measurement circuitry 640, e.g., non-differential measurement circuitry, that provides a measurement of the signal on receive electrode 631 with respect to a common point, e.g., ground. Driving two electrodes with signals of opposite phase as shown in FIG. 6 can serve to enhance the signal to noise ratio (SNR) of measured signal 641 due to cancellation of stray mutual capacitance, for example. However, under some conditions the differential drive method can yield inaccurate results. For example, if two touches of equal magnitude are located on two oppositely-driven electrodes, and also located on the same receive electrode, the changes due to the two touches will tend to cancel each other out so the signal on the receive electrode is decreased and touch may not be detected. This condition can be avoided by driving one of the drive signals on an electrode that is spatially separated from the touch location, referred to herein as a touch-distant electrode. Use of touch-distant electrodes as drive electrodes is described in more detail below.

According to some embodiments, differential receivers may be used to measure the difference between pairs of receive electrodes, rather than measuring the difference between individual receive electrodes and a ground or common point. With differential measurement, one receive electrode may serve as a reference for measurement of another receive electrode.

Given receive electrodes of relative uniform size, shape, and electrical characteristics, common mode noise affects all electrodes equally, so differential measurement may remove the common mode noise. There are cases where common mode noise affects some electrodes more than others, even in a uniform electrode array. For example, a noise source close to one edge of a sensor will cause more noise on electrodes closer to the noise source, resulting in a non-uniform distribution of noise across the sensor. Where this is the case, the receive electrodes may be divided into groups, where each group has similar common mode noise. A reference electrode may then be selected for each group. A reference electrode may be located among electrodes experiencing similar noise characteristics in the active area of a touch screen, and may be touch-distant. In some embodiments, a single reference electrode can be used for all receive measurements. As described in more detail below, selection of a reference receive electrode may have similar criteria to selection of a reference driven electrode.

Figure 7:
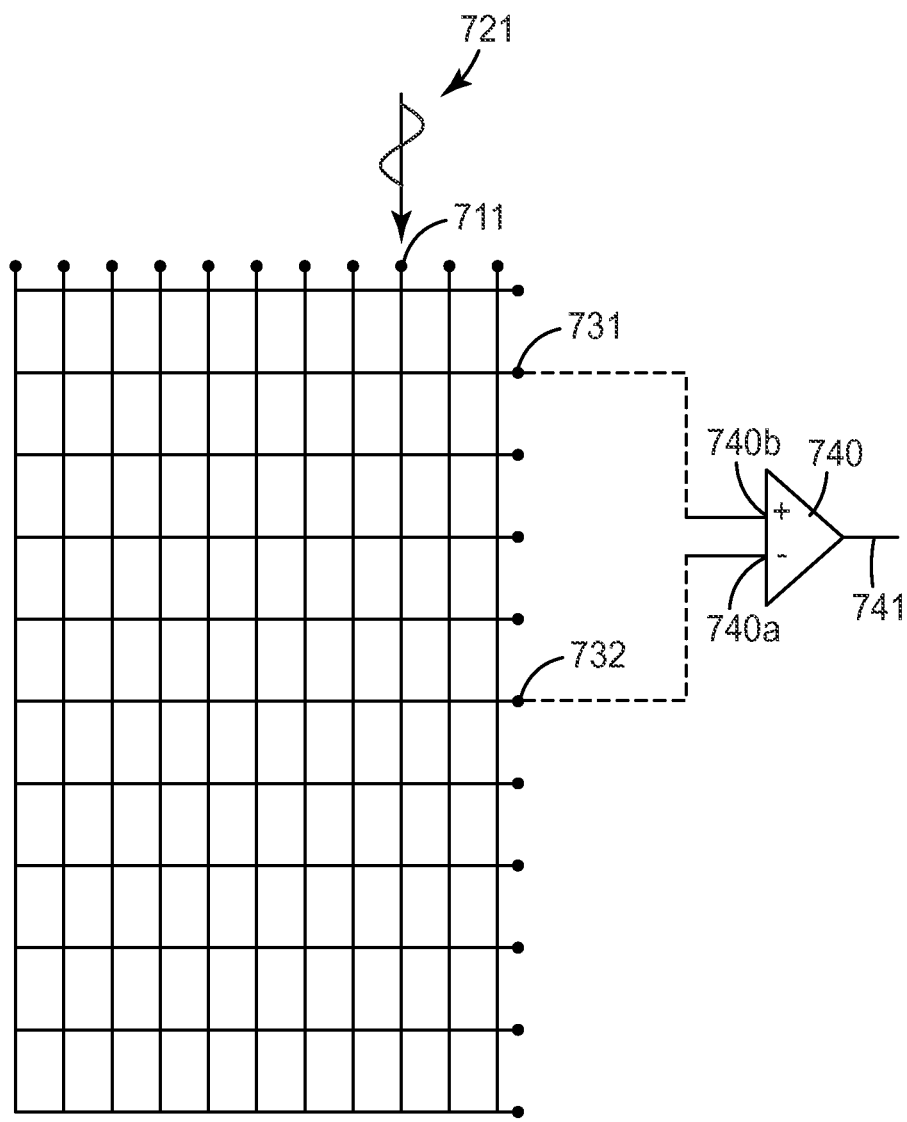
FIG. 7 shows an example of a touch sensitive electrode matrix in which a single drive signal referenced to ground is applied to a single drive electrode.

FIG. 7 shows an example of a touch sensitive electrode matrix in which a single drive signal 721 referenced to a common point or ground is applied to a single drive electrode 711. The signal from two receive electrodes 731, 732 is measured using differential measurement circuitry 740 to provide differential measurement signal 741. The differential measurement circuitry 740 depicted in FIG. 7 comprises an amplifier having an inverting input 740a and a non-inverting input 740b. Receive electrode 732 serves as a reference electrode and is shown to be coupled to the inverting input 740a. Receive electrode is coupled to the non-inverting input 740b. It will be appreciated that the differential measurement can also be achieved by coupling the reference electrode 732 to the non-inverting input 740b and coupling the remaining receive electrode 731 to the inverting input. Other methods of measuring the difference in signals between electrodes are known in the art, for example the differential measurement circuitry 740 may comprise a switched capacitor circuit.

Differentially measuring signals from pairs of receive electrodes can significantly reduce common mode noise. As with differentially driven electrodes, differential measurement may also cancel out useful signal information. Simultaneous, equal changes to two electrodes due to touches of equal magnitude may not be detected by differential measurement of the two electrodes. As previously discussed these errors can be mitigated when one of the receive electrodes used to measure the differential signal is a touch distant electrode that is spatially separated from the touch location.

Figure 8:
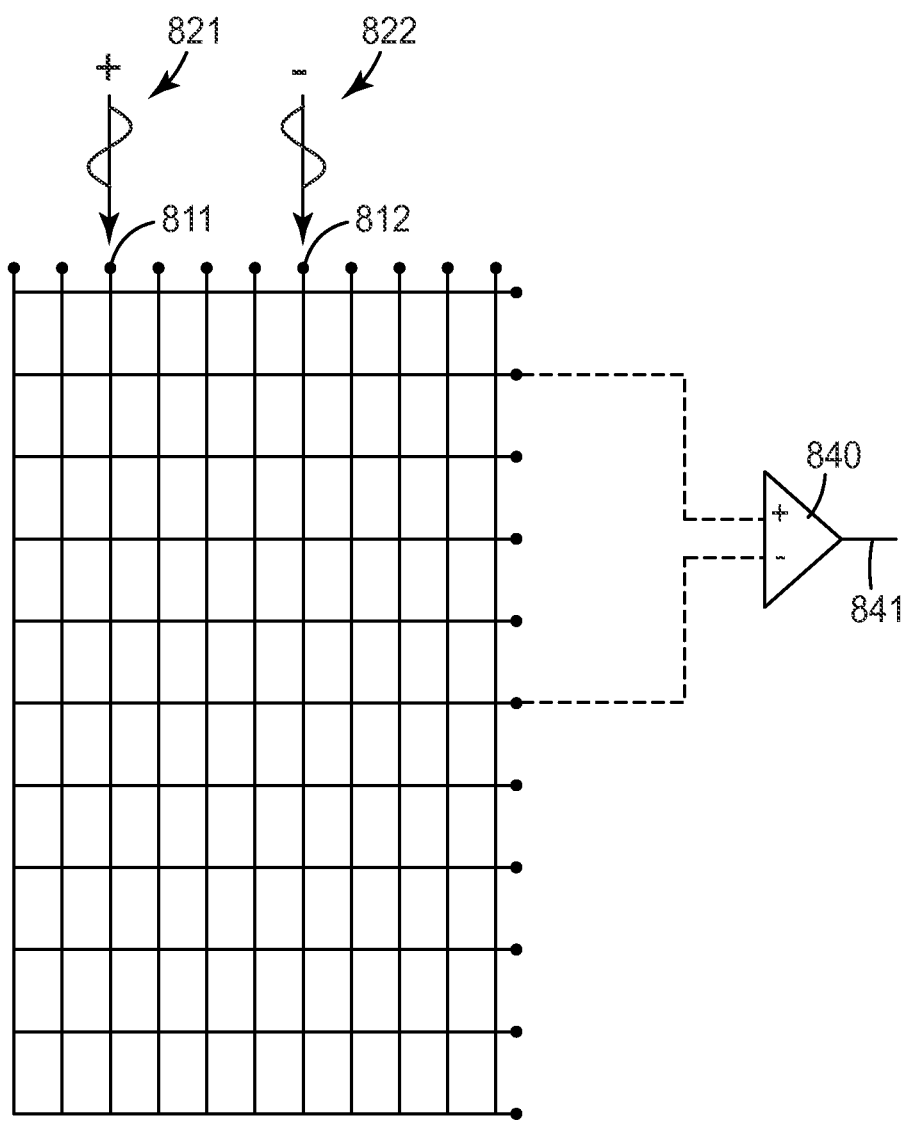
FIG. 8 illustrates an example of a touch sensitive electrode matrix in which two drive electrodes are driven with signals of opposite phase and a measured signal is measured by differential measurement circuitry.

FIG. 8 illustrates an example of a touch sensitive electrode matrix in which two drive electrodes 811, 812 are driven with signals 821, 822 of opposite phase and the measured signal 841 is measured by differential measurement circuitry 840 the difference between the received signal on two receive electrodes 831, 832. Using differential drive in combination with differential receive may allow lower cost, lower power circuits to be used because the differential techniques provide a lower SNR of the measured signal.

According to various implementations, one or more touch-distant electrodes can be used as a reference electrode for the differential receive technique and/or the differential drive technique. The use of touch distance electrodes may reduce common mode noise and avoid errors that may arise from using electrodes near the touch location as reference electrodes as previously discussed. In some cases, the touch-distant electrode may be selected based on the likelihood that the electrode will be touched.

Figure 9:
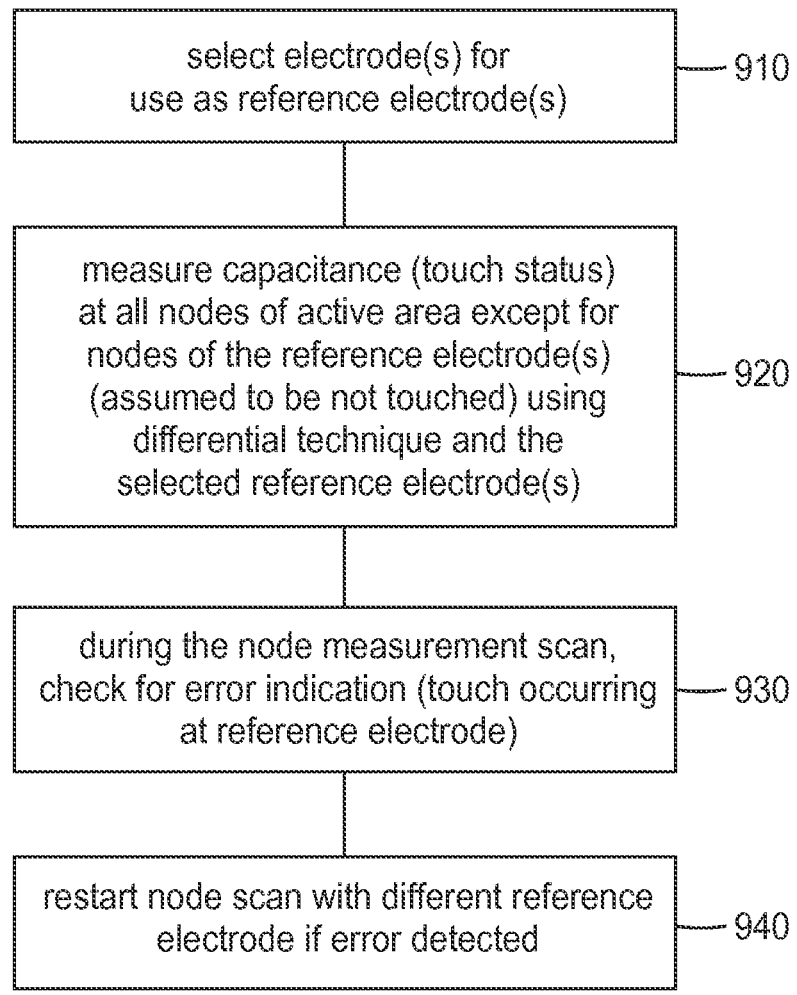
FIG. 9 is a flow diagram illustrating a scan process for obtaining measurements from electrodes of a touch sensitive electrode matrix.

FIG. 9 is a flow diagram of a scan process in accordance with embodiments described herein. One or more electrodes are selected 910 for use as reference electrodes. Identification of the reference electrodes may be accomplished using a pre-scan process, for example. In some embodiments, the pre-scan process may involve measuring the self-capacitance (capacitance to the ground or common) or measuring mutual capacitance for each drive and/or receive electrode to determine which electrodes are proximate to a touch location. Self-capacitance measurements can take less time and provide less accurate touch location information when compared to mutual capacitance scans. The touch signals acquired from the pre-scan indicate whether certain electrodes are touch-distance or touch-proximate. The reference electrodes are selected from the group of touch-distance electrodes.

After the reference electrodes are selected, mutual capacitance (indicative of the touch status) is measured 920 at all nodes of an active area except for the nodes of the one or more reference electrodes using a differential technique and the selected reference electrode(s). The reference electrodes are assumed not to be touched. During the node measurement scan, a check 930 is performed to determine if an error has occurred. An error may be indicated, for example if a touch is detected at a reference electrode. The measured touch signals have an expected phase or polarity, and an error is indicated if at least one of the measured touch signals is of opposite phase or polarity to the expected phase or polarity. In the event that an error is indicated, the node scan is restarted 940 with a different reference electrode. In some cases, the different reference electrode is determined by performing a pre-scan process. The different reference electrode may be chosen from a pool of possible reference electrodes that have been selected during a previous pre-scan process.

Figure 10:
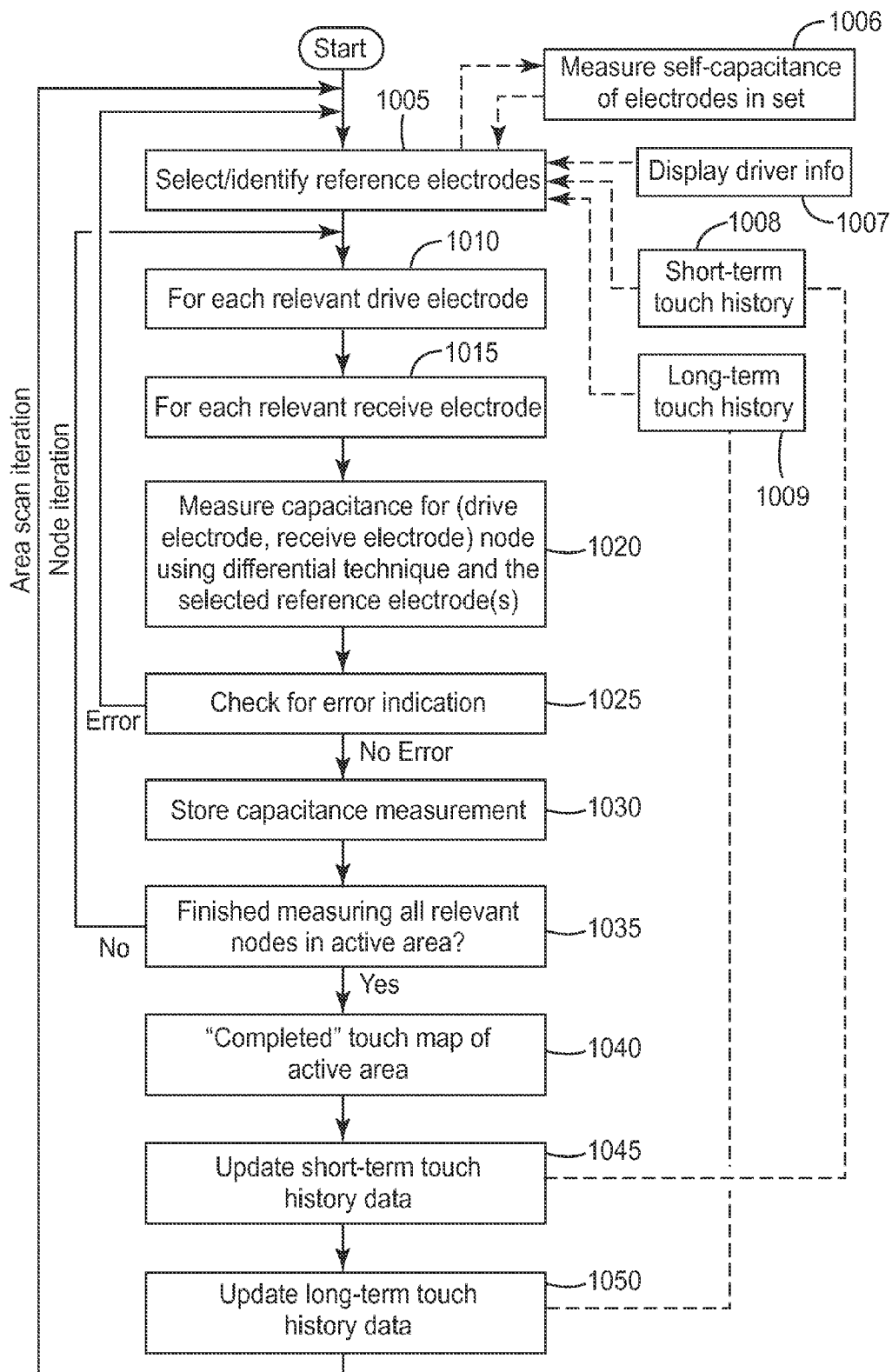
FIG. 10 shows a flow diagram of a scan process that determines touch location(s) of a touch area using a differential technique in accordance with embodiments described herein.

FIG. 10 shows a more detailed diagram of a scan process that determines touch location(s) of a touch area using a differential technique in accordance with embodiments described herein. In some embodiments, the area scan iteration includes identifying and selecting 1005 electrode(s) that are touch-distant and suitable for use as reference electrodes. The identification of touch-distant electrodes can be accomplished using one or more processes exemplified by processes 1006-1009 shown in FIG. 10. For example, the touch-distant electrodes may be identified by one or more of measurement of self-capacitance, display driver information, short term touch history, and long term touch history. Additionally or alternatively, the physical location of the electrodes of the touch device may be used to identify touch-distant electrodes. For example, some electrodes are unlikely to be touched because of their physical location in the touch area or are inaccessible, e.g., covered by a bezel or other structure.

In some embodiments, suitable reference electrodes are identified 1006 using a pre-scan process that measures the self-capacitance of each electrodes. Electrodes that exhibit changes in their self-capacitance indicative of a nearby touch are eliminated as possible reference electrodes. If no electrodes are determined to be proximate to a touch, the self-capacitance measurements may be repeated until a touch is detected. Identifying a touch by repetitively prescanning for self-capacitance measurements can reduce touchdown detection time and pre-touchdown power dissipation.

Self-capacitance of an electrode may be determined by measuring the electrical response of the electrode to a stimulus signal applied directly to the electrode, or the electrical response of the electrode to a stimulus signal coupled to the electrode via capacitance or inductance. Using a process that measures self-capacitance of all drive (or receive) electrodes allows for a fast response time to a touch and a low power consumption because the self-capacitance of all of the driven electrodes may be measured in one measurement cycle.

For example, electrodes less likely to be touch-proximate may be estimated from knowledge of the information displayed. An application with touch buttons in known locations is most likely to be touched in the vicinity of one of the buttons, so electrodes outside the button area are more likely to be touch-distant. As one example, a cell phone or pad with an unlock button will initially be touched in a known area.

Figure 11:
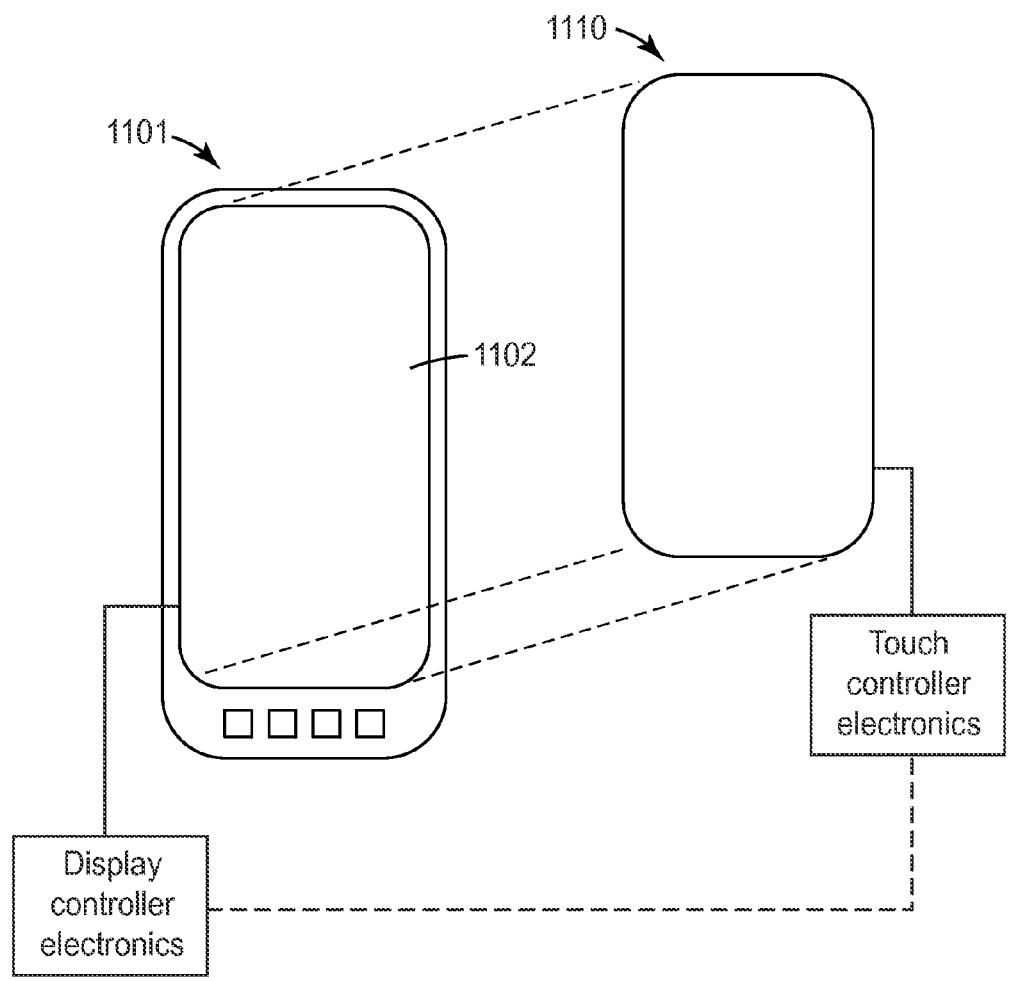
FIG. 11 shows a touch sensitive display device that includes a display that is visible through a transparent touch screen.

FIG. 11 shows an exploded view of touch sensitive display device 1101 that includes a display, e.g., a liquid crystal display (LCD), a light emitting diode (LED) display or other type of display 1102 that is visible through a transparent touch screen 1110. The touch screen is controlled by touch controller electronics. The information displayed on the display 1102 is controlled by display controller electronics. The touch controller electronics and the display controller electronics may share information such as display information used in the identification of likely touch-distant electrodes.

Figure 12:
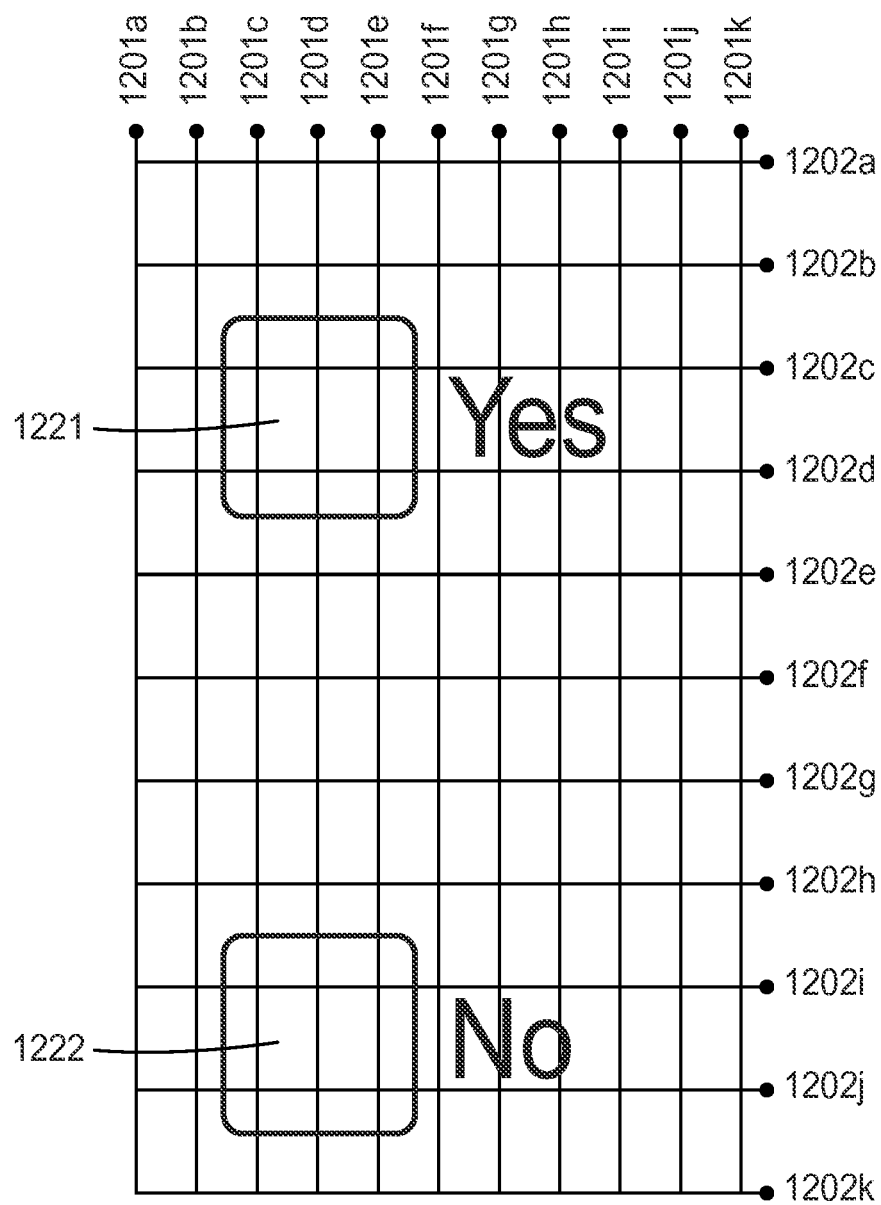
FIG. 12 is a view of the display and touch screen of FIG. 11.

FIG. 12 is a more detailed view of the display and touch screen. The touch screen includes drive and receive electrodes 1201*a*-1201*k*, 1202*a*-1202*k*. The display portion of the touch sensitive display device displays graphics 1221, 1222 and associated text "Yes" and "No." Such a display prompts the user to touch box 1221 to choose the "Yes" response and to touch box 1222 to choose the "No" response. A touch in box 1221 would most likely occur at or near nodes 1201*c*/1202*c*, 1201*c*/1202*d*, 1201*d*/1202*c*, 1201*d*/1202*d*, 1201*e*/1202*c*, or 1201*e*/1202*d*. A touch in box 1222 would most likely occur at or near nodes 1201*c*/1202*i*, 1201*c*/1202*j*, 1201*d*/1102*i*, 1201*d*/1202*j*, 1201*e*/1202*i*, or 1201*e*/1202*j*. With regard to drive electrodes 1201*a*-1201*k*, electrodes 1201*j*, 1201*k* are less likely to be proximate to a touch and more likely to be touch-distant when compared with drive electrodes 1201*c*, 1201*d*, 1201*e*. With regard to receive electrodes 1202*a*-1202*k*, electrodes 1202*f* and 1202*g* are less likely to be proximate to a touch and more likely to be touch-distant when compared with electrodes 1202*c*, 1202*d*, 1202*i*, and 1202*j*. Thus, based on the display information, which can be provided by the display device driver, the drive and/or receive electrodes that are more likely to be touch-distant can be selected as the reference electrodes.

In some embodiments the short term touch history and/or long term touch history may be used to identify 1008, 1009 the touch-distant reference electrode(s). Touch-distant electrode(s) can be identified 1008 based on a history of one or more of the more recent touch location scans of the touch area. The recent touch history can comprise the most recent touch location scans, e.g., mutual capacitance scans, performed in a moving time window of a few milliseconds, e.g., about 1 to 10 milliseconds for example. In some implementations mutual capacitance scan of the touch area determines which electrodes are recently touch-proximate and which are recently touch-distant. The recently touch-distant electrode(s) can be selected for use as reference electrodes. Using this method may mean that pre-scan processes and/or additional circuitry are not needed. For example, pre-scan processes and circuitry that measure self-capacitance may not be needed when the touch-distant electrode(s) are identified using historical information based on mutual capacitance measurements.

In some embodiments, touch-distant electrode(s) are identified 1009 using a long term history of least-touched areas, where the long term touch history may comprise touch location information within a moving window of greater than 10 milliseconds.

Using information such as display application information, short term touch history, and/or long term search history to identify touch-distant reference electrodes, as discussed above, may reduce or eliminate the need for pre-scanning to identify touch-distant electrodes. For example, if some of the touch-distant electrodes are identified using display application and/or touch history information, all the electrodes in the touch area may not need to be measured which reduces the scan time of the touch area.

Following identification and selection of the touch-distant electrodes, the node iteration process is performed wherein the mutual capacitance at some or all nodes in the touch area is measured. The node iteration process is explained in the context of using a differential drive technique in conjunction with a differential receive technique, although it will be appreciated that in some embodiments the differential receive technique or the differential receive techniques may be separately employed.

In the differential drive technique, a number of selected touch-distant electrodes may be driven with one (reference) phase while probable touch-proximate electrodes are driven with the opposite phase. This allows driving and measuring all electrodes on a of a touch sensor in as little as half the time needed for a scan using single-ended drive electrodes if, for example, half of electrodes are driven (sequentially) with +phase while the other half are driven (sequentially) with −phase signals. In some cases touch-proximate signals are less stable over time than touch distant signals because the magnitude of touch signals may vary during a measurement scan. Touch-distant signals may not be subject to these variations. In some implementations, given a known touch-distant reference and a phase sensitive (e.g. synchronous demodulator) measuring circuit, touch-distant electrodes can be driven with a reference phase signal (e.g. +Phase) that will produce positive signals on touch-proximate receive electrodes and near-zero signals on touch-distant receive electrodes. This allows the use of unipolar analog to digital converters (ADCs) in the measurement circuitry, wherein the unipolar ADCs measure only positive signals, or have higher resolution and/or greater dynamic range in the positive direction. If electrodes are selectively driven, and a measurable negative signal is detected, there may be a touch in proximity with the previously-supposed touch-distant electrode. If the ADC measures negative signals with sufficient accuracy, the negative signal may be used to improve touch location calculations. If the ADC can detect but cannot measure negative signals accurately, the negative signal may be used to indicate that the reference electrode is probably touch-proximate, and it may be driven and measured accordingly in a subsequent scan.

Turning back to FIG. 10, once the touch-distant reference electrodes are selected, the mutual capacitance is measured 1020 for each relevant drive electrode and each relevant receive electrode using the selected touch-distant electrodes and a differential measurement technique. Relevant drive and receive electrodes are those electrodes that can be proximate to a touch location. For each node measurement iteration, the process checks 1025 to determine if an error is indicated. The error indication is associated with a reference electrode proximate to the touch location. If an error is indicated, the process returns to identify and select different touch-distant reference electrode(s) 1005. During the node measurement iterations, the system analyzes the measured touch signals for an indication that the first reference electrode is experiencing a touch and in response to the indication, selects at least one different electrode to function as the reference electrode.

If an error is not indicated, the capacitance measurement for the node is stored 1030. The system determines whether or not all relevant nodes in the active area have been measured 1035. If all of the relevant nodes have not been measured, the process returns to perform an additional measurement iteration for the relevant drive and receive electrodes 1010, 1015. If all of the relevant nodes in the active area have been measured 1035, the touch map of the active area is completed 1040. Short-term touch history data 1008 is updated 1045. Long-term touch history data 1009 is updated 1050. The system returns to select 1005 reference electrode(s) and/or to detect the presence of a touch. According to various embodiments, after one or more touch-distant reference electrode(s) are selected, e.g., by one of the methods discussed above, a drive sequence is calculated whereby pairs of opposite-phase signals are driven sequentially. One or more touch-distant electrodes are driven with a reference phase, (e.g. +Phase) while all other electrodes, (including all known touch-proximate electrodes are sequentially driven with a first phase, (e.g. −Phase).

One or more additional rules for performing the node measurement iteration may be applied in any order. Examples of these additional rules include:

1. In some cases, (e.g. if few (or no) touch-distant reference electrodes are reliably identified), a single reference electrode may be driven with a first phase, while all other electrodes are scanned sequentially with the opposite phase. If all electrodes are identified as touch-proximate, an electrode with the smallest touch-related change may be sequentially paired with every other electrode.
2. Each group of touch-proximate electrodes (presumably associated with a single touch) may be sequentially driven with −Phase signals while a single touch-distant electrode is repeatedly driven with reference +Phase signals. This ensures that interpolation of signals within the touch-proximate group will be measured relative to a single consistent reference signal.
3. Each touch-distant electrode is paired with a touch-proximate electrode that is at least two electrodes away, such that there is at least one touch-distant electrode between a driven touch-proximate electrode and a simultaneously driven touch-distant reference electrode.

4. Each touch-distant electrode is paired with a touch-proximate electrode that is no more than four electrodes away, i.e. there are no more than two or three touch-distant electrodes between a driven touch-proximate electrode and a simultaneously driven touch-distant electrode.
5. After all touch-distant electrodes have been paired with touch-proximate electrodes according to the above rules, remaining touch-distant electrodes may be paired with one another. Or, if pre-scanning is recent and reliable, the remaining touch-distant electrodes may not be scanned at all.
6. If touch-proximate electrodes comprise less than half of all driven electrodes, each touch-proximate electrode may be paired with a different touch-distant electrode. The use of this rule can reduce scanning time by up to 50%.

It may not be possible to comply with all of the rules above during a scan. If this is true, the rules may be followed in a priority order. According to various implementations, the rules are followed in the order that they are presented above (1, 2, 3, etc.), although in other implementations the rules may be followed in a different order than the order presented above.

In some cases, a scanning method comprises sequentially driving each successive electrode across an array with a +Phase while driving the adjacent electrode with a −Phase. This scan results in a set of measurements that represent incremental changes between adjacent electrodes across the active area. These changes can be analyzed in sequence to reproduce touch locations.

Figure 13:
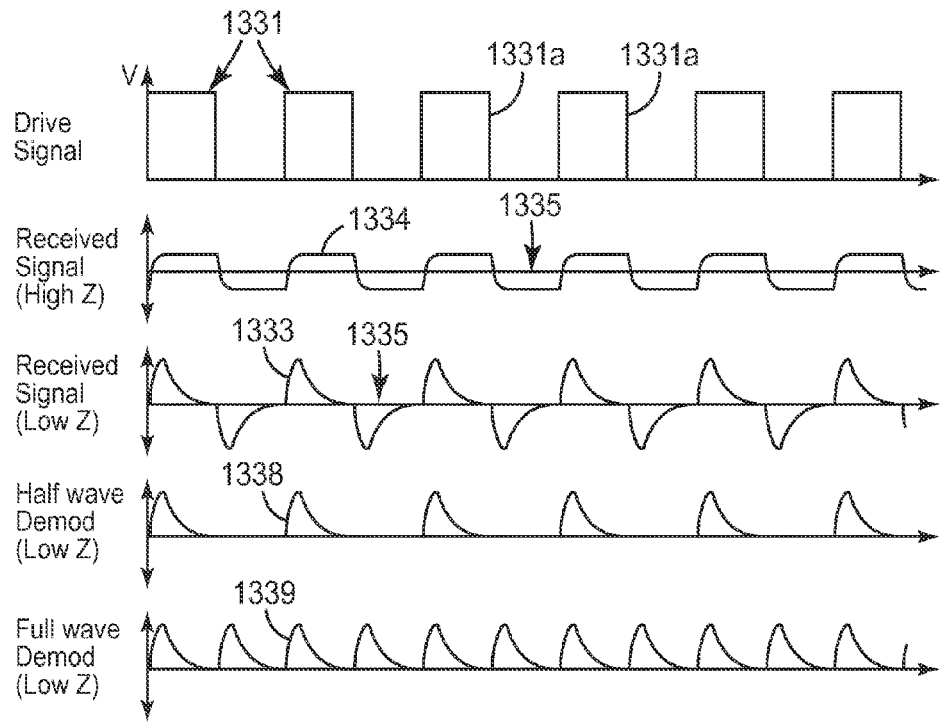
FIG. 13 shows exemplary time-varying drive signal and corresponding receive signals.

FIG. 13 shows exemplary time-varying drive signal 1331 and receive signals 1333 and 1334. Drive signal 1331 is capacitively coupled to receive electrodes so positive transitions of drive signals cause positive received signals on receive electrodes. Negative-going transitions 1331a of drive signals 1331 cause negative received signals on receive electrodes. Signals 1333 and 1334 are typical of two different input circuit types, so they would not normally occur in the same system. Signal 1333 may be generated by low input impedance measurement circuits, (relative to the touch sensor) such as those with a summing junction or low impedance accumulator capacitors at the input. Signal 1334 may be generated by high input impedance measurement circuits, (relative to the touch sensor) such as those with high-Z buffer circuits at the input.

Received signals in mutual capacitance systems typically comprise time varying signals centered on a baseline 1335. Positive excursions and negative excursions from the baseline 1335 will have equal electrical charge, which may be measured as area under receive signal 1333. Given near-symmetrical drive pulses, e.g. pulses with equal rates of change in positive and negative directions, received signals 1333 will have positive and negative excursions from the baseline that are essentially equal in magnitude, as shown in FIG. 13.

Measurement systems may measure only the positive (above-baseline) portion of received signals, or only the negative (below-baseline) portion, (e.g. half wave demodulation) or, both positive and negative excursions may be measured, (e.g. full wave demodulation). A phase sensitive (synchronous) demodulator (half wave or full wave) can measure specific portions of a signal, e.g. it can measure received signals 1333 or 1334 when driven signal 1331 is high (above baseline 1335) and/or when signal 1331 is low (below baseline 1335). Signal 1338 is an example of a half wave synchronous demodulated signal, measured only during the time that drive signal 1331 is high. Signal 1339 is an example of a full wave synchronous demodulated signal, the positive half of which is measured only during the time that drive signal 1331 is high, and the negative half of which is inverted and measured when signal 1331 is low.

Measured signals such as 1338 and 1339 may be filtered (e.g. averaged or integrated over time) prior to conversion by an ADC and measurement.

Figure 14A:
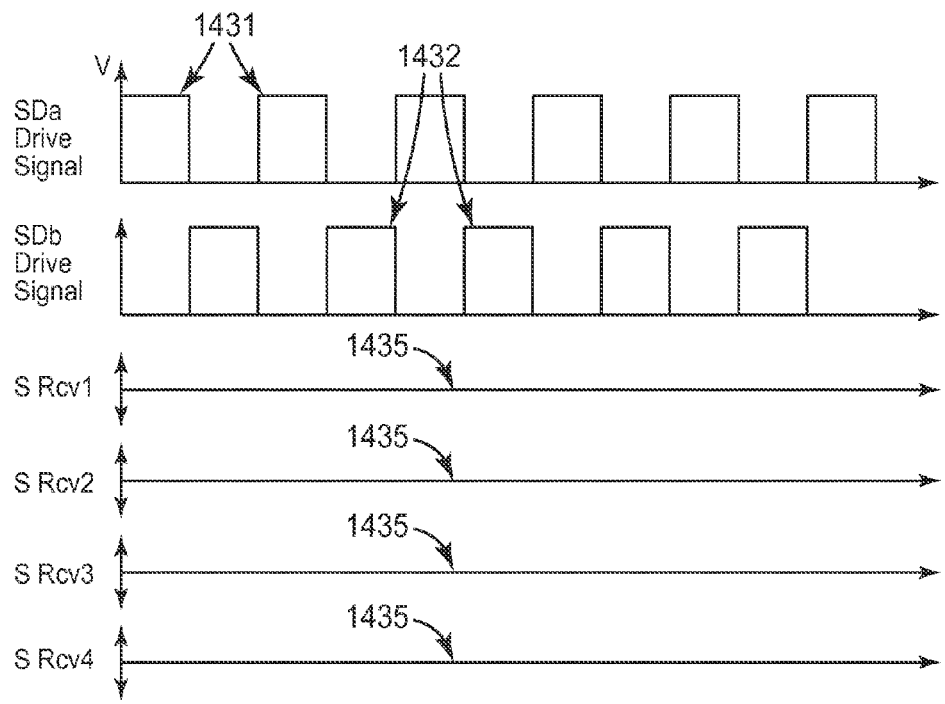
FIGS. 14A-14D show examples where two electrodes are driven with opposite phases, and one of the two driven electrodes is touch-distant.

FIG. 14A shows exemplary +Phase driven signal 1431 and −Phase driven signal 1432 that are symmetrical, equal in magnitude and opposite in phase. If drive signals $S_{Da}$ 1431 and $S_{Db}$ 1432 are applied simultaneously to electrodes Da and Db, respectively (see FIG. 4), receive electrodes Rcv1-Rcv4 will receive capacitively coupled signals from $S_{Rcv1}$-$S_{Rcv4}$ from drive signals $S_{Da}$ and $S_{Db}$ which will sum to near zero so essentially no signals will appear on the receive electrodes Rcv1-Rcv4 as shown in FIG. 14A.

Figure 14B:
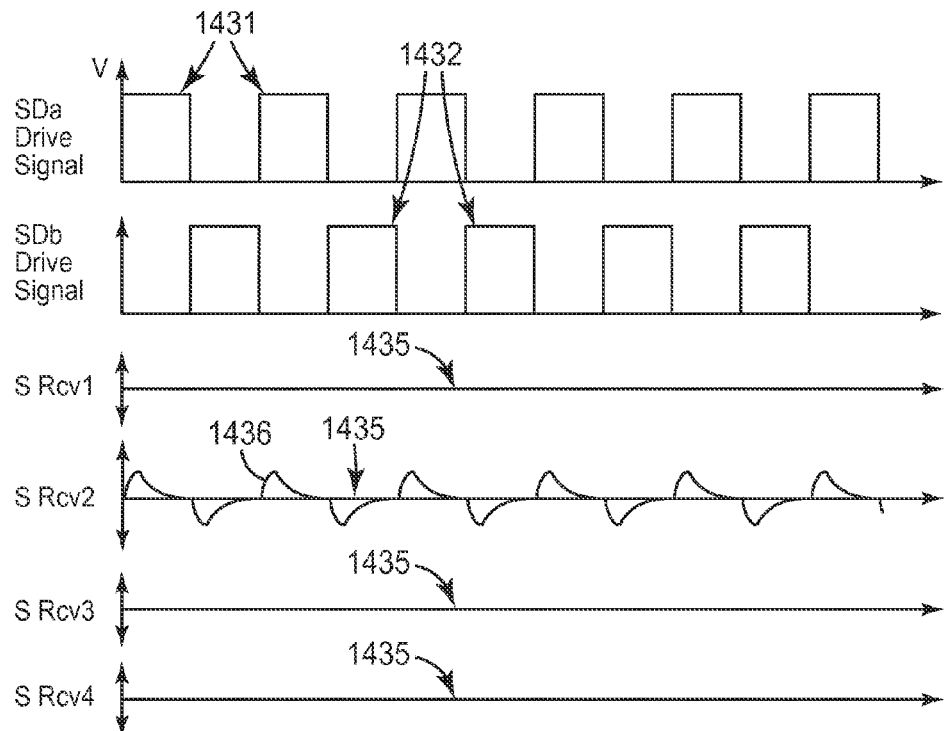

FIG. 14B shows exemplary +Phase driven signal 1431 and −Phase signal 1432 applied simultaneously to electrodes Da and Db, respectively (see FIG. 4). In this example, T1 reduces −Phase signal 1432 coupled from Db to Rcv2, while the signals coupled from Db to Rcv1, Rcv3, and Rcv4 are undiminished. +Phase signal 1431 is coupled to all receive electrodes Rcv1-Rcv4 undiminished. Thus, signal 1436 received from Rcv2 contains more of the +Phase signal than −Phase signal and Da+Db will have appreciable magnitude and positive phase. The magnitude of signal 1436 is indicative of the difference between mutual capacitance Cm2a and Cm2b, (FIG. 4). The phase of signal 1436 (being the same phase as the signal applied to Da) indicates that Cm2a is larger than Cm2b, so touch T1 is known to be at Cm2b.

Figure 14C:
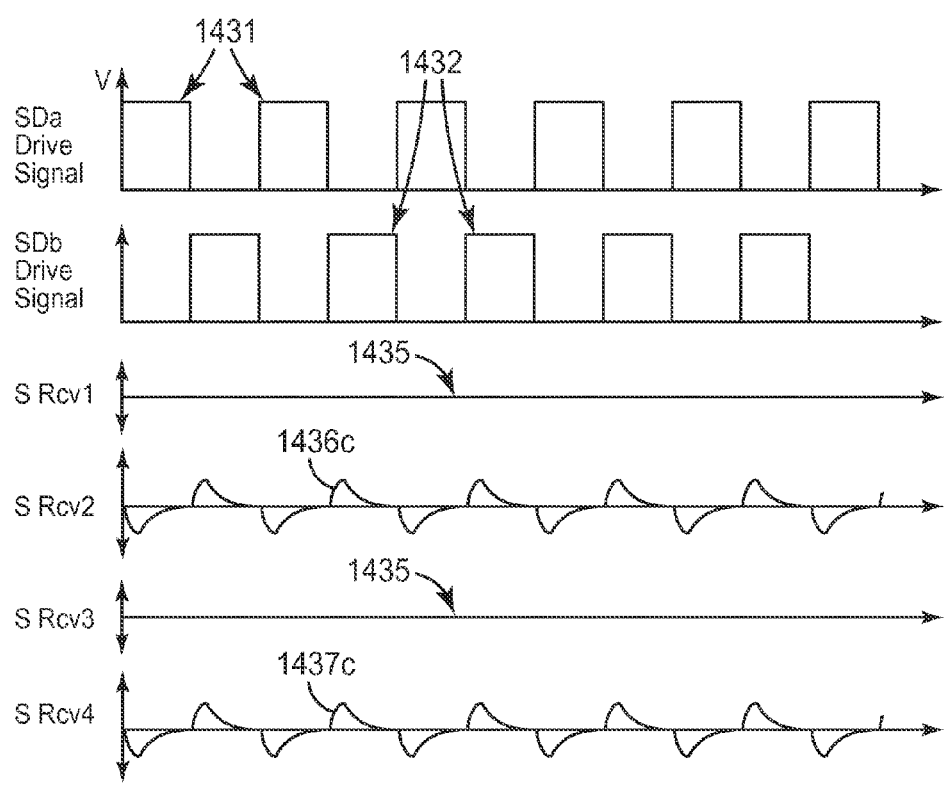

FIG. 14C shows exemplary +Phase driven signal 1431 and −Phase signal 1432 applied simultaneously to electrodes Dc and Da, (FIG. 4) respectively. Touch T3 reduces +Phase signal 1431 coupled from Dc to Rcv2, and Touch T2 reduces +Phase signal 1431 coupled from Dc to Rcv4, while the signals coupled from Dc to Rcv1 and Rcv3 are undiminished. −Phase signal 1431 is coupled from Da to all receive electrodes Rcv1-Rcv4 undiminished.

Thus, signal 1436c received from Rcv2 contains more of the −Phase signal than +Phase signal. The magnitude of signal 1436c is indicative of the difference between mutual capacitance Cm2c and Cm2a, (FIG. 4). The phase of signal 1436c (being the same phase as the signal applied to Dc) indicates that Cm2a is larger than Cm2c, so touch T3 is known to be at Cm2c.

Similarly, signal 1437c received from Rcv2 contains more of the −Phase signal than +Phase signal. The magnitude of signal 14137c is indicative of the difference between mutual capacitance Cm4c and Cm4a, (FIG. 4). The phase of signal 437c (being the same phase as the signal applied to Dc) indicates that Cm4a is larger than Cm4c, so touch T2 is known to be at Cm4c.

FIGS. 14A-14C show examples where two electrodes are driven with opposite phases, and one of the two driven electrodes is touch-distant. In some implementations, two touch-proximate electrodes may be driven simultaneously with the result that received signals counter-balance one another and no measurable signal change is detected.

Figure 14D:
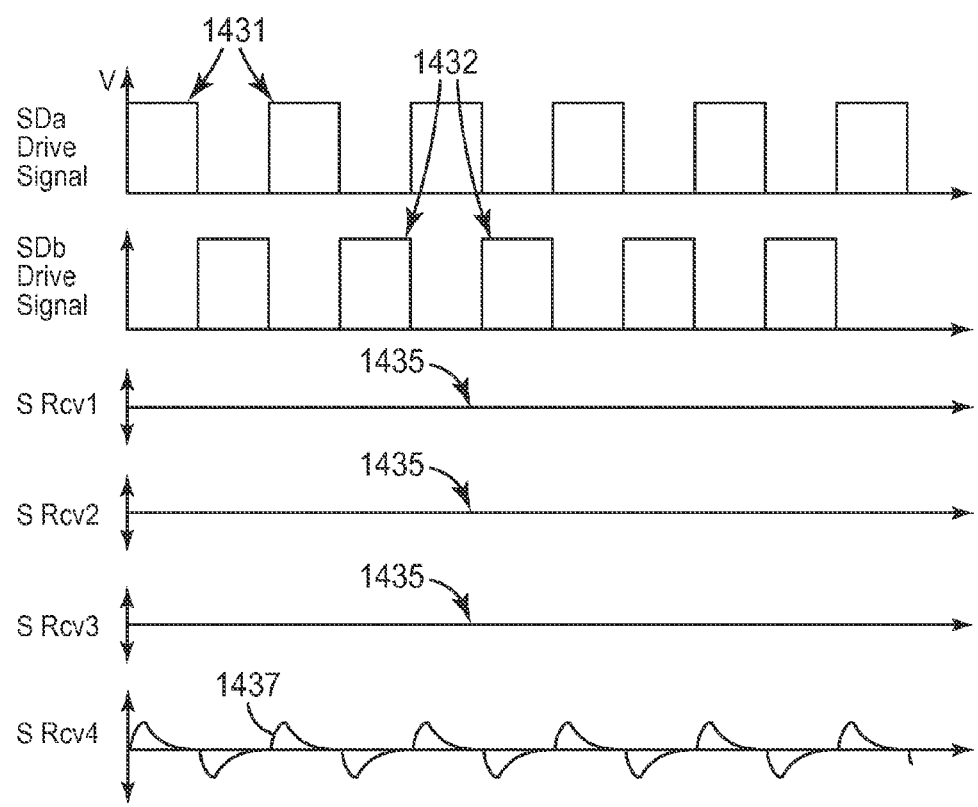

FIG. 14D shows a case where Db and Dc are driven simultaneously with signals 1431 and 1432 respectively. Touches T1 and T3 shown in FIG. 4 may be of equal magnitude such that signals coupled from electrodes Db and Dc will be equally attenuated. This may cause signals coupled from Db and Dc to counterbalance one another so the signal received on Rcv2 will remain near zero, even with the perturbation of two touches T1 and T3. Touch T2 will reduce the signal coupled from Dc to Rcv4, relative to the signal coupled from Db to Rcv4, so the signal received on Rcv4 will indicate a touch as shown in FIG. 14D.

EXAMPLES

For comparison, Table 1a shows touch signal strengths that may be measured from a system using non-differential methods. When electrode Db is driven, Touch T1 causes a 20% reduction in the signal received by electrode Rcv2, and when electrode Dc is driven, Touches T2 and T3 cause 20% reductions in the signals received by electrodes Rcv2 and Rcv4 respectively. Table 1b shows the signal changes, which are used to locate touches.

TABLE 1a

|  | Da | Db | Dc | Dd |
| --- | --- | --- | --- | --- |
| Rcv1 | 0 | 0 | 0 | 0 |
| Rcv2 | 0 | −0.2 | −0.2 | 0 |
| Rcv3 | 0 | 0 | 0 | 0 |
| Rcv4 | 0 | 0 | −0.2 | 0 |

TABLE 1b

|  | Da | Db | Dc | Dd |
| --- | --- | --- | --- | --- |
| Rcv1 | 1 | 1 | 1 | 1 |
| Rcv2 | 1 | 0.8 | 0.8 | 1 |
| Rcv3 | 1 | 1 | 1 | 1 |
| Rcv4 | 1 | 1 | 0.8 | 1 |

Table 2a shows touch signal strengths that may be measured from system using a differential drive and phase-sensitive measurement with non-differential receivers. In this simplified case, electrode Da was chosen as the reference electrode, and it was driven with a +Phase signal. Three measurement cycles are required; Da is driven with +Phase while Db, then Dc, then Dd are driven with a −Phase signal. When electrodes Da and Db are driven, Touch T1 causes a 20% reduction in the signal received by electrode Rcv2, and when electrode Da and Dc are driven, Touches T2 and T3 cause 20% reductions in the signals received by electrodes Rcv2 and Rcv4 respectively. Table 2a contains results that show the same touch change results as Table 1B. This should be true because there is no touch influence on the reference electrode Da.

TABLE 2a

| A = Ref | Da-Db | Da-Dc | Da-Dd | Min/Row |
| --- | --- | --- | --- | --- |
| Rcv1 | 0.0 | 0.0 | 0.0 | 0.0 |
| Rcv2 | 0.0 | 0.2 | 0.2 | 0.0 | 0.0 |
| Rcv3 | 0.0 | 0.0 | 0.0 | 0.0 | 0.0 |
| Rcv4 | 0.0 | 0.0 | 0.2 | 0.0 | 0.0 |

TABLE 2b

| A = Ref | Da | Db | Dc | Dd |
| --- | --- | --- | --- | --- |
| Rcv1 | 0.0 | 0.0 | 0.0 | 0.0 |
| Rcv2 | 0.0 | 0.2 | 0.2 | 0.0 |
| Rcv3 | 0.0 | 0.0 | 0.0 | 0.0 |
| Rcv4 | 0.0 | 0.0 | 0.2 | 0.0 |

Table 3a shows touch signal strengths that may be measured from using the same conditions as for Table 2a, except electrode Db as the reference instead of Da. Db is driven with +Phase while Da, then Dc, then Dd are driven with a −Phase signal. According to various embodiments, Db is not chosen for a reference electrode because touch T1 affects it, but this example shows how this may be compensated.

When electrodes Db and Da are simultaneously driven, Touch T1 causes a 20% change in the signal received by electrode Rcv2, and when electrode Db and Dc are driven, Touches T1 and T3 counterbalance each other, causing no change in the signals received by electrode Rcv2. Touch T2 causes a 20% change in the signal received by electrode Rcv4. When electrodes Db and Dd are simultaneously driven, Touch T1 causes a 20% change in the signal received by electrode Rcv2.

The difference results in Table 3a can be used to calculate touch locations using the following algorithm.
1. The minimum difference value measured on each receive electrode (each row of Table 3a) is calculated, as shown in the Min/Row column of Table 3a.
2. If the minimum difference value of each row is negative, it is subtracted from every difference value in the row, resulting in the magnitude values shown in Table 3b. This last step essentially re-references the signals of each receive electrode to zero. 1. [If the reference drive electrode had a non-zero baseline (due to a proximate touch), then adjust the reference (and all measurements made relative to that reference) to zero baseline.]

The calculated results in Table 3b are the same as the measured results in Table 1b. From these, filtering and interpolation may be done to calculate touch locations.

TABLE 3a

|  | Db-Da | B = Ref | Db-Dc | Db-Dd | Min/Row |
| --- | --- | --- | --- | --- | --- |
| Rcv1 | 0.0 | 0.0 | 0.0 | 0.0 | 0.0 |
| Rcv2 | −0.2 | 0.0 | 0.0 | −0.2 | −0.2 |
| Rcv3 | 0.0 | 0.0 | 0.0 | 0.0 | 0.0 |
| Rcv4 | 0.0 | 0.0 | 0.2 | 0.0 | 0.0 |

TABLE 3b

| B = Ref | Da | Db | Dc | Dd |
| --- | --- | --- | --- | --- |
| Rcv1 | 0.0 | 0.0 | 0.0 | 0.0 |
| Rcv2 | 0.0 | −0.2 | −0.2 | 0.0 |
| Rcv3 | 0.0 | 0.0 | 0.0 | 0.0 |
| Rcv4 | 0.0 | 0.0 | −0.2 | 0.0 |

Table 4a shows the results of measuring the simplified touch-proximate pattern of system using differential drive and differential receivers. Electrode Db is used as the single reference electrode, driven with +Phase signals. Rcv4 is used as the reference for all measurements.

TABLE 4a

| B = Ref | Da | Db | Dc | Dd |
| --- | --- | --- | --- | --- |
| Rcv1-Rcv4 | 0.0 | 0.0 | −0.2 | 0.0 |
| Rcv2-Rcv4 | −0.2 | 0.0 | −0.2 | −0.2 |
| Rcv3-Rcv4 | 0.0 | 0.0 | −0.2 | 0.0 |
| Rcv4-Rcv4 | 0.0 | 0.0 | 0.0 | 0.0 |
| Rev's >= 0 | 3.0 | 4.0 | 1.0 | 3.0 |
|  | 0 | 0 | −0.2 | 0 |

Numerous types of algorithms may be used to determine touch locations from the differential measurements shown in Table 4a. One example includes the following processes:

1) Measure receive electrode differentials while driving reference electrode (Db) in combination with other electrodes. Three measurement cycles are may be used for this example because Rcv4-Rcv4 may not require a measurement.

2) Log Receive electrode difference values and make a matrix as exemplified by Table 4a. In some cases, no negative values (indicating a touch) are in the matrix, and appreciable positive values are found, an error is indicated and a different drive electrode may be selected as the reference 3) Determine the minimum value, Vm, measured for each driven electrode pair electrode (each column of Table 4a). Log these numbers into a table. These values are shown in the Min row of Table 4a. If half or more of the values in the Min row are negative, an error may be indicated and an alternative reference receive electrode may be selected. If any of the values in the Min row are significantly more negative than a touch should cause, an error may be indicated and an alternative reference electrode is be selected.

4) Determine the number (Nc) of receive electrode difference values in each column that are above a pre-determined threshold, (e.g. above zero).

5) The receive baselines may be adjusted. For example, the receive baselines can be adjusted if Nc is less than 2, and the min value Vm is added to all measured values in the column. These values are recorded in Table 4b. If the selected receive electrode reference (e.g. Rcv4) is touch-distant and a given driven electrode is not touch-proximate over most of its length, then most differences in each column of Table 4a will be near zero, and Nc will be a relatively high number. If a reference receive electrode is touch proximate where it intersects a given driven electrode, most measurements of that driven electrode will be negative. This is evident in Table 4a where touch T2 affects reference electrode Rcv4 and driven electrode Dc. Most measurements Db-Dc measure negative due to T2. The number Nc<2 is chosen for this simplified example. Practical touch systems generally have more electrodes, so a different number may be used. Various filtering algorithms may be used to determine if a receive reference electrode is influenced by a proximate touch.

6) Adjust drive baselines: Using the receive baseline-adjusted values in Table 4b, Find the minimum value measured by each measurement circuit. These values are shown in the Min/Row column of Table 4b.

7) If the Min/Row value is less than zero, add the min value to every value in the row to adjust the baselines. The final result is touch positions shown in Table 4c.

TABLE 4b

|  | Db-Da | B = Ref | Db-Dc | Db-Dd | Min/Row |
|---|---|---|---|---|---|
| Rcv1-Rcv4 | 0.0 | 0.0 | 0.0 | 0.0 | 0.0 |
| Rcv2-Rcv4 | −0.2 | 0.0 | 0.0 | −0.2 | −0.2 |
| Rcv3-Rcv4 | 0.0 | 0.0 | 0.0 | 0.0 | 0.0 |
| Rcv4-Rcv4 | 0.0 | 0.0 | 0.2 | 0.0 | 0.0 |

TABLE 4c

| A = Ref | Da | Db | Dc | Dd |
|---|---|---|---|---|
| Rcv1 | 0.0 | 0.0 | 0.0 | 0.0 |
| Rcv2 | 0.0 | 0.2 | 0.2 | 0.0 |
| Rcv3 | 0.0 | 0.0 | 0.0 | 0.0 |
| Rcv4 | 0.0 | 0.0 | 0.2 | 0.0 |

According to various implementations, errors can be avoided by selecting reference that are touch-distant. In some cases, during or immediately prior to a scan, capacitance of reference electrodes may change due to a new proximate touch or to noise. Generally the algorithms described above may compensate for this situation. Errors may occur if a reference electrode has a relatively large number of touch-proximate nodes.

Table 5a shows a pattern of four touches on a 4×4 matrix. If this touch pattern is measured using driven electrode Da for a reference, the touches are measured accurately. If electrode Db is the reference, the measured results are as shown in Table 5b and measured touch locations are incorrectly calculated as shown in Table 5c.

TABLE 5a

|  | Da | Db | Dc | Dd |
|---|---|---|---|---|
| Rcv1 | 0 | 0 | 0 | 0 |
| Rcv2 | 0 | −0.2 | −0.2 | 0 |
| Rcv3 | 0 | 0 | 0 | 0 |
| Rcv4 | 0 | 0 | −0.2 | 0 |

TABLE 5b

| B = Ref | Da | Db | Dc | Dd |
|---|---|---|---|---|
| Rcv1-Rcv4 | 0.0 | 0.0 | −0.2 | −0.2 |
| Rcv2-Rcv4 | −0.2 | 0.0 | −0.2 | −0.4 |
| Rcv3-Rcv4 | 0.0 | 0.0 | −0.2 | −0.2 |
| Rcv4-Rcv4 | 0.0 | 0.0 | 0.0 | 0.0 |
| Rev's >= 0 | 3.0 | 4.0 | 1.0 | 1.0 |
| Min | 0 | 0 | −0.2 | −0.4 |

TABLE 5c

|  | Da | Db | Dc | Dd |
|---|---|---|---|---|
| Rcv1 | 0.0 | 0.0 | 0.0 | 0.2 |
| Rcv2 | 0.0 | 0.2 | 0.2 | 0.2 |
| Rcv3 | 0.0 | 0.0 | 0.0 | 0.2 |
| Rcv4 | 0.0 | 0.0 | 0.2 | 0.4 |

The touch results shown in Table 5b may not be reported because several error checks indicate errors. The value (−0.4) in the Min row is significantly more negative than a touch should cause. Half of the values in the Min row are negative, indicating that the reference receive electrode may have more than one touch-proximate nodes. Given these errors, new reference electrode(s) may be selected and a new scan should be done.

According to various embodiments, during periods of no-touch, a baseline of driven signal differences is established by driving various pairs of electrodes with opposite phase signals and measuring the resulting signals on receive electrodes. A table of baseline values may be stored, and baseline values may be subtracted from subsequent measurements.

To the degree that fixed stray capacitances of a sensor are not the same, pre-touch calibration can be done and a table of errors can be used to correct subsequent measurements.

Embodiments disclosed herein include the following items.

Item 1. A method of determining touches on a touch panel, the touch panel comprising a plurality of electrodes arranged in an electrode matrix comprising a first set of electrodes capacitively coupled to a second set of electrodes at an array of nodes defining an active touch-sensitive area of the touch panel, the method comprising:
receiving information indicative of which of the electrodes in the first set of electrodes are not experiencing, or are unlikely to experience, a touch;
selecting, based on the received information, at least one electrode from the first set of electrodes to function as a first reference electrode, remaining ones of the first set of electrodes referred to as first remaining electrodes; and
measuring touch signals for at least some of the nodes using a differential technique, the differential technique for each such node utilizing the first reference electrode in combination with at least one of the first remaining electrodes and with at least one of the electrodes from the second set of electrodes.

Item 2. The method of item 1, wherein the differential technique comprises a differential drive technique in which a first drive signal is coupled to the first reference electrode and a second drive signal is coupled to the at least one of the first remaining electrodes, the first and second drive signals being out of phase with each other, and the at least one of the electrodes from the second set of electrodes is coupled to a measurement circuit.

Item 3. The method of any of items 1 through 2, wherein the differential technique comprises a differential receive technique in which the at least one of the electrodes from the second set of electrodes is coupled to a drive signal, and the first reference electrode and the at least one of the first remaining electrodes are coupled to a difference circuit.

Item 4. The method of item 3, wherein the difference circuit comprises an amplifier having an inverting input and a non-inverting input, and wherein the first reference electrode is coupled to the inverting input or to the non-inverting input, and the at least one of the first remaining electrodes is coupled to the non-inverting input or to the inverting input, respectively.

Item 5. The method of item 3, wherein the difference circuit comprises a switched capacitor circuit.

Item 6. The method of any of items 1 through 5, wherein the differential technique comprises both a differential drive technique and a differential receive technique.

Item 7. The method of any of items 1 through 6, further comprising:
monitoring the measured touch signals for an indication that the first reference electrode is experiencing a touch.

Item 8. The method of item 7, wherein the measured touch signals have an expected phase or polarity, and wherein the indication comprises at least one of the measured touch signals being of opposite phase or polarity to the expected phase or polarity.

Item 9. The method of item 7, further comprising:
in response to the indication, selecting at least one different electrode from the first set of electrodes to function as the first reference electrode.

Item 10. The method of any of items 1 through 9, further comprising:
measuring self-capacitances of at least some of the electrodes in the first set of electrodes;
wherein the received information comprises the measured self-capacitances.

Item 11. The method of any of items 1 through 10, wherein the measuring is part of a scan of touch data for the array of nodes, and wherein the received information comprises touch data for the array of nodes from a previous scan.

Item 12. The method of any of items 1 through 11, wherein the received information comprises historical touch data for the array of nodes.

Item 13. The method of any of items 1 through 12, wherein the touch panel is used with a display, and wherein the received information comprises display information for the display.

Item 14. A method of determining touches on a touch panel, the touch panel comprising a plurality of electrodes arranged in an electrode matrix comprising a first set of electrodes capacitively coupled to a second set of electrodes at an array of nodes defining an active touch-sensitive area of the touch panel, the method comprising:
selecting at least one electrode from the first set of electrodes to function as a first reference electrode, remaining ones of the first set of electrodes referred to as first remaining electrodes;
measuring touch signals for at least some of the nodes using a differential technique, the differential technique for each such node utilizing the first reference electrode in combination with at least one of the first remaining electrodes and with at least one of the electrodes from the second set of electrodes;
monitoring the measured touch signals for an indication that the first reference electrode is experiencing a touch; and
in response to the indication, selecting at least one different electrode from the first set of electrodes to function as the first reference electrode.

Item 15. The method of item 14, wherein the measured touch signals have an expected characteristic, and wherein the indication comprises at least one of the measured touch signals not having the expected characteristic.

Item 16. The method of item 15, wherein the expected characteristic comprises an expected phase or polarity.

Item 17. The method of any of items 14 through 16, wherein the differential technique comprises a differential drive technique in which a first drive signal is coupled to the first reference electrode and a second drive signal is coupled to the at least one of the first remaining electrodes, the first and second drive signals being out of phase with each other, and the at least one of the electrodes from the second set of electrodes is coupled to a measurement circuit.

Item 18. The method of any of items 14 through 17, wherein the differential technique comprises a differential receive technique in which the at least one of the electrodes from the second set of electrodes is coupled to a drive signal, and the first reference electrode is coupled to an inverting input or a non-inverting input of an amplifier, and the at least one of the first remaining electrodes is coupled to the non-inverting input or the inverting input, respectively, of the amplifier.

Item 19. The method of any of claims 14 through 18, wherein the differential technique comprises a differential receive technique in which the at least one of the electrodes from the second set of electrodes is coupled to a drive signal, and the first reference electrode and the at least one of the first remaining electrodes are coupled to a difference circuit.

Item 20. The method of claim 19, wherein the difference circuit comprises an amplifier having an inverting input and a non-inverting input, and wherein the first reference electrode is coupled to the inverting input or to the non-inverting input, and the at least one of the first remaining electrodes is coupled to the non-inverting input or to the inverting input, respectively.

Item 21. The method of claim 19, wherein the difference circuit comprises a switched capacitor circuit.

Item 22. A device, comprising:
 a touch panel comprising a plurality of electrodes arranged in an electrode matrix comprising a first set of electrodes capacitively coupled to a second set of electrodes at an array of nodes defining an active touch-sensitive area of the touch panel; and
 controller electronics coupled to the touch panel, the controller electronics configured to:
  receive information indicative of which of the electrodes in the first set of electrodes are not experiencing, or are unlikely to experience, a touch;
  select, based on the received information, at least one electrode from the first set of electrodes to function as a first reference electrode, remaining ones of the first set of electrodes referred to as first remaining electrodes; and
  measure touch signals for at least some of the nodes using a differential technique, the differential technique for each such node utilizing the first reference electrode in combination with at least one of the first remaining electrodes and with at least one of the electrodes from the second set of electrodes.

Item 23. A device, comprising:
 a touch panel comprising a plurality of electrodes arranged in an electrode matrix comprising a first set of electrodes capacitively coupled to a second set of electrodes at an array of nodes defining an active touch-sensitive area of the touch panel; and
 controller electronics coupled to the touch panel, the controller electronics configured to:
  select at least one electrode from the first set of electrodes to function as a first reference electrode, remaining ones of the first set of electrodes referred to as first remaining electrodes;
  measure touch signals for at least some of the nodes using a differential technique, the differential technique for each such node utilizing the first reference electrode in combination with at least one of the first remaining electrodes and with at least one of the electrodes from the second set of electrodes;
  monitor the measured touch signals for an indication that the first reference electrode is experiencing a touch; and
  in response to the indication, select at least one different electrode from the first set of electrodes to function as the first reference electrode.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the embodiments are approximations, to the extent any numerical values are set forth in specific examples described herein, they are reported as precisely as reasonably possible. Any numerical value, however, may well contain errors associated with testing or measurement limitations.

Various modifications and alterations of the embodiments disclosed herein will be apparent to those skilled in the art. For example, the reader should assume that features of one disclosed embodiment can also be applied to all other disclosed embodiments unless otherwise indicated.

The invention claimed is:

1. A method of determining touches on a touch panel, the touch panel comprising a plurality of electrodes arranged in an electrode matrix comprising a first set of electrodes capacitively coupled to a second set of electrodes at an array of nodes defining an active touch-sensitive area of the touch panel, the method comprising:
 receiving information indicative of which of the electrodes in the first set of electrodes are not experiencing, or are unlikely to experience, a touch;
 selecting, based on the received information, at least one electrode from the first set of electrodes that are not experiencing, or are unlikely to experience, a touch to function as a first reference electrode, remaining ones of the first set of electrodes referred to as first remaining electrodes; and
 measuring touch signals for at least some of the nodes using a differential technique, the differential technique for each such node utilizing the first reference electrode in combination with at least one of the first remaining electrodes and with at least one of the electrodes from the second set of electrodes.

2. The method of claim 1, wherein the differential technique comprises a differential drive technique in which a first drive signal is coupled to the first reference electrode and a second drive signal is coupled to the at least one of the first remaining electrodes, the first and second drive signals being out of phase with each other, and the at least one of the electrodes from the second set of electrodes is coupled to a measurement circuit.

3. The method of claim 1, wherein the differential technique comprises a differential receive technique in which the at least one of the electrodes from the second set of electrodes is coupled to a drive signal, and the first reference electrode and the at least one of the first remaining electrodes are coupled to a difference circuit.

4. The method of claim 3, wherein the difference circuit comprises an amplifier having an inverting input and a non-inverting input, and wherein the first reference electrode is coupled to the inverting input or to the non-inverting input, and the at least one of the first remaining electrodes is coupled to the non-inverting input or to the inverting input, respectively.

5. The method of claim 3, wherein the difference circuit comprises a switched capacitor circuit.

6. The method of claim 1, wherein the differential technique comprises both a differential drive technique and a differential receive technique.

7. The method of claim 1, further comprising:
 monitoring the measured touch signals for an indication that the first reference electrode is experiencing a touch.

8. The method of claim 7, wherein the measured touch signals have an expected phase or polarity, and wherein the indication comprises at least one of the measured touch signals being of opposite phase or polarity to the expected phase or polarity.

9. The method of claim 7 further comprising:
in response to the indication, selecting at least one different electrode from the first set of electrodes to function as the first reference electrode.

10. The method of claim 1, further comprising:
measuring self-capacitances of at least some of the electrodes in the first set of electrodes;
wherein the received information comprises the measured self-capacitances.

11. The method of claim 1, wherein the measuring is part of a scan of touch data for the array of nodes, and wherein the received information comprises touch data for the array of nodes from a previous scan.

12. The method of claim 1, wherein the received information comprises historical touch data for the array of nodes.

13. The method of claim 1, wherein the touch panel is used with a display, and wherein the received information comprises display information for the display.

14. A method of determining touches on a touch panel, the touch panel comprising a plurality of electrodes arranged in an electrode matrix comprising a first set of electrodes capacitively coupled to a second set of electrodes at an array of nodes defining an active touch-sensitive area of the touch panel, the method comprising:
selecting at least one electrode from the first set of electrodes to function as a first reference electrode, remaining ones of the first set of electrodes referred to as first remaining electrodes;
measuring touch signals for at least some of the nodes using a differential technique, the differential technique for each such node utilizing the first reference electrode in combination with at least one of the first remaining electrodes and with at least one of the electrodes from the second set of electrodes;
monitoring the measured touch signals for an indication that the first reference electrode is experiencing a touch; and
in response to the indication, selecting at least one different electrode from the first set of electrodes to function as the first reference electrode.

15. The method of claim 14, wherein the measured touch signals have an expected characteristic, and wherein the indication comprises at least one of the measured touch signals not having the expected characteristic.

16. The method of claim 15, wherein the expected characteristic comprises an expected phase or polarity.

17. The method of claim 14, wherein the differential technique comprises a differential drive technique in which a first drive signal is coupled to the first reference electrode and a second drive signal is coupled to the at least one of the first remaining electrodes, the first and second drive signals being out of phase with each other, and the at least one of the electrodes from the second set of electrodes is coupled to a measurement circuit.

18. The method of claim 14, wherein the differential technique comprises a differential receive technique in which the at least one of the electrodes from the second set of electrodes is coupled to a drive signal, and the first reference electrode is coupled to an inverting input or a non-inverting input of an amplifier, and the at least one of the first remaining electrodes is coupled to the non-inverting input or the inverting input, respectively, of the amplifier.

19. The method of claim 14, wherein the differential technique comprises a differential receive technique in which the at least one of the electrodes from the second set of electrodes is coupled to a drive signal, and the first reference electrode and the at least one of the first remaining electrodes are coupled to a difference circuit.

20. The method of claim 19, wherein the difference circuit comprises an amplifier having an inverting input and a non-inverting input, and wherein the first reference electrode is coupled to the inverting input or to the non-inverting input, and the at least one of the first remaining electrodes is coupled to the non-inverting input or to the inverting input, respectively.

21. The method of claim 19, wherein the difference circuit comprises a switched capacitor circuit.

22. A device, comprising:
a touch panel comprising a plurality of electrodes arranged in an electrode matrix comprising a first set of electrodes capacitively coupled to a second set of electrodes at an array of nodes defining an active touch-sensitive area of the touch panel; and
controller electronics coupled to the touch panel, the controller electronics configured to:
receive information indicative of which of the electrodes in the first set of electrodes are not experiencing, or are unlikely to experience, a touch;
select, based on the received information, at least one electrode from the first set of electrodes that are not experiencing, or are unlikely to experience, a touch to function as a first reference electrode, remaining ones of the first set of electrodes referred to as first remaining electrodes; and
measure touch signals for at least some of the nodes using a differential technique, the differential technique for each such node utilizing the first reference electrode in combination with at least one of the first remaining electrodes and with at least one of the electrodes from the second set of electrodes.

23. A device, comprising:
a touch panel comprising a plurality of electrodes arranged in an electrode matrix comprising a first set of electrodes capacitively coupled to a second set of electrodes at an array of nodes defining an active touch-sensitive area of the touch panel; and
controller electronics coupled to the touch panel, the controller electronics configured to:
select at least one electrode from the first set of electrodes to function as a first reference electrode, remaining ones of the first set of electrodes referred to as first remaining electrodes;
measure touch signals for at least some of the nodes using a differential technique, the differential technique for each such node utilizing the first reference electrode in combination with at least one of the first remaining electrodes and with at least one of the electrodes from the second set of electrodes;
monitor the measured touch signals for an indication that the first reference electrode is experiencing a touch; and
in response to the indication, select at least one different electrode from the first set of electrodes to function as the first reference electrode.

* * * * *

UNITED STATES PATENT AND TRADEMARK OFFICE
CERTIFICATE OF CORRECTION

PATENT NO. : 10,168,825 B2
APPLICATION NO. : 15/107113
DATED : January 1, 2019
INVENTOR(S) : Bernard Geaghan Page 1 of 1

It is certified that error appears in the above-identified patent and that said Letters Patent is hereby corrected as shown below:

In the Specification

<u>Column 11</u>
Line 45, After "electrodes" delete "on a".

Signed and Sealed this
First Day of October, 2019

Andrei Iancu
*Director of the United States Patent and Trademark Office*